US012372043B2

(12) United States Patent
Koda et al.

(10) Patent No.: US 12,372,043 B2
(45) Date of Patent: Jul. 29, 2025

(54) STIRLING ENGINE

(71) Applicant: Yanmar Holdings Co., Ltd., Osaka (JP)

(72) Inventors: Kazuyuki Koda, Osaka (JP); Masato Kitazaki, Osaka (JP); Jiro Fukudome, Osaka (JP); Osamu Sakamoto, Maibara (JP); Nobu Kobayashi, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/790,958

(22) Filed: Jul. 31, 2024

(65) Prior Publication Data

US 2025/0043747 A1 Feb. 6, 2025

(30) Foreign Application Priority Data

Aug. 1, 2023 (JP) ................................ 2023-125596
Apr. 18, 2024 (JP) ................................ 2024- 067536

(51) Int. Cl.
*F02G 1/047* (2006.01)
*F02G 1/05* (2006.01)
*F02G 1/06* (2006.01)

(52) U.S. Cl.
CPC ............... *F02G 1/047* (2013.01); *F02G 1/05* (2013.01); *F02G 1/06* (2013.01); *F02G 2243/00* (2013.01)

(58) Field of Classification Search
CPC ... F02G 1/047; F02G 1/05; F02G 1/06; F02G 2243/00
See application file for complete search history.

(56) References Cited

U.S. PATENT DOCUMENTS

2010/0101762 A1* 4/2010 Kroliczek ............. F28D 15/043 165/104.26
2011/0083436 A1* 4/2011 White ........................ F01K 3/08 165/104.19
2012/0159945 A1* 6/2012 Akazawa .............. F28G 13/005 60/526
2014/0174080 A1* 6/2014 Friesth .................... F03G 4/037 60/516
2015/0143806 A1* 5/2015 Friesth .................... F01K 13/02 220/592.2

FOREIGN PATENT DOCUMENTS

JP 2010-101299 A 5/2010

* cited by examiner

*Primary Examiner* — Hoang M Nguyen
(74) *Attorney, Agent, or Firm* — NORTON ROSE FULBRIGHT US LLP

(57) ABSTRACT

A Stirling engine includes: the thermosiphon that accommodates the heating medium receiving heat from a heat source; and an engine unit that has a body accommodating working gas. A heater that gives heat to the working gas by the heating medium is arranged in the body. The Stirling engine includes an engine controller that executes control for increasing an absorbed amount of thermal energy from the heating medium when at least one of the pressure and the temperature of the heating medium exceeds a predetermined value.

18 Claims, 21 Drawing Sheets

FIG. 4

STIRLING ENGINE

CROSS-REFERENCE TO RELATED APPLICATION

This application claims priority under 35 U.S.C. § 119 to Japanese Patent Applications No. JP2023-125596, filed on Aug. 1, 2023 and JP2024-067536, filed on Apr. 18, 2024, the entire contents of which are hereby incorporated by reference in their entireties.

TECHNICAL FIELD

The present invention relates to a Stirling engine.

BACKGROUND ART

For example, the following system is disclosed in Patent Document 1. In the system, a heat exchanger for converting water into water vapor by heat in exhaust gas is provided within a duct, through which the exhaust gas flows, the water vapor is then guided to an object to be heated, and the object to be heated is thereby heated with condensation heat. The heat exchanger that uses water as a medium (a heating medium) for heat exchange is also referred to as a thermosiphon.

PRIOR ART DOCUMENT

Patent Document

Patent Document 1: Japanese Unexamined Patent Application Publication No. 2010-101299

SUMMARY OF INVENTION

Technical Problem

In Patent Document 1, when an internal pressure (a pressure of the heating medium) of the heat exchanger becomes a certain pressure or higher, a valve is opened to prevent a pressure increase, thereby attempting efficient heat transfer. However, when the valve is opened, an amount of the heating medium that fills inside of the heat exchanger is reduced. Consequently, a temperature of the heat exchanger, which is exposed to the exhaust heat, is increased, which possibly damages the heat exchanger. Such a problem may also occur when a temperature of the heating medium becomes a certain temperature or higher and the valve is opened.

The present invention has been made to solve the above problem, and an object of the present invention is to provide a Stirling engine capable of suppressing an increase in at least one of a pressure and a temperature of a heating medium without releasing the heating medium to outside and thereby avoiding damage to a thermosiphon as a heat exchanger even when at least one of the pressure and the temperature of the heating medium is increased.

Solution to Problem

A Stirling engine according to one aspect of the present invention is a Stirling engine including: a thermosiphon that accommodates a heating medium receiving heat from a heat source; and an engine unit that has a body accommodating working gas, in which a heater that gives the heat to the working gas by the heating medium is arranged in the body.

The Stirling engine further includes an engine controller that executes control for increasing an absorbed amount of thermal energy from the heating medium when at least one of a pressure and a temperature of the heating medium exceeds a predetermined value.

Advantageous Effects of Invention

With the above configuration, even when at least one of the pressure and the temperature of the heating medium is increased, the increase thereof is suppressed without releasing the heating medium to the outside, and damage to the thermosiphon can thereby be avoided.

DESCRIPTION OF EMBODIMENTS

Embodiments of the present invention will be described with reference to the drawings.

1. BASIC CONFIGURATION OF STIRLING ENGINE

Figure 1:
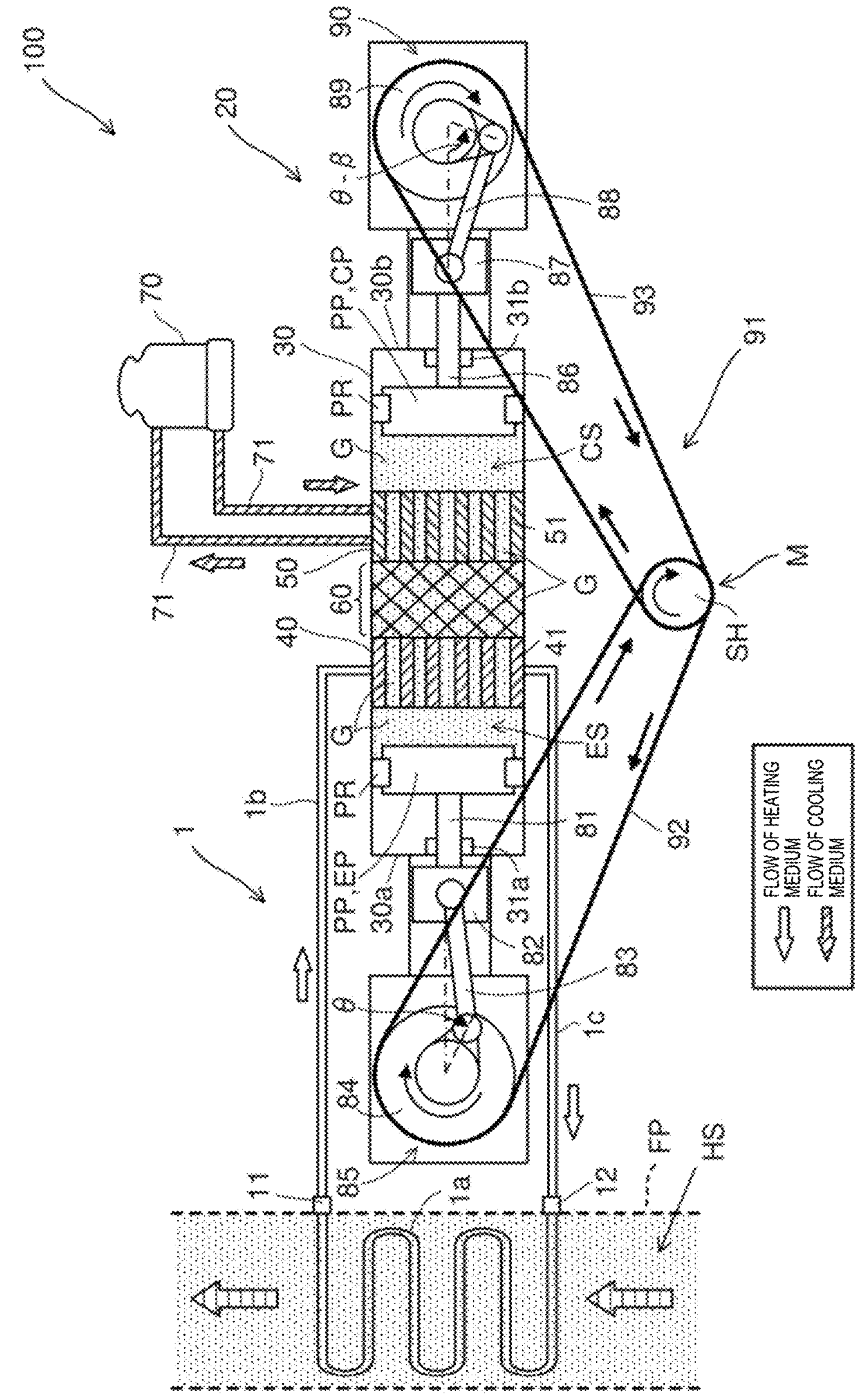
FIG. 1 is an explanatory view illustrating a schematic configuration of a Stirling engine according to an embodiment of the present invention.

FIG. 1 is an explanatory view illustrating a basic configuration of a Stirling engine 100 according to the embodiment of the present invention. The Stirling engine 100 includes a thermosiphon 1 and an engine unit 20.

(1-1. Thermosiphon)

The thermosiphon 1 accommodates a heating medium that receives heat from a heat source HS. For example, factory exhaust heat can be assumed as the heat source HS. Alternatively, the heat source HS may be solar heat, geothermal heat, or the like. The heat source HS moves within a flow path FP. The flow path FP is formed of a heat exhaust pipe, for example.

The thermosiphon 1 includes a first pipe 1*a*, a second pipe 1*b*, and a third pipe 1*c* as pipes through which the heating medium flows. The first pipe 1*a* is located inside the flow path FP. The second pipe 1*b* and the third pipe 1*c* are located outside the flow path FP. Accordingly, the thermosiphon 1 is partially arranged in the flow path FP.

The second pipe 1*b* is located on a downstream side of the first pipe 1*a* in a flow direction of the heating medium. The first pipe 1*a* and the second pipe 1*b* are connected via a first connection section 11. The first connection section 11 is provided on a wall surface of the flow path FP. An end portion of the second pipe 1*b* on an opposite side from an end portion thereof connected to the first pipe 1*a* is connected to an upper portion of a body 30 of the engine unit 20.

The third pipe 1*c* is located on an upstream side of the first pipe 1*a* in the flow direction of the heating medium. The first pipe 1*a* and the third pipe 1*c* are connected via a second connection section 12. The second connection section 12 is provided on the wall surface of the flow path FP. An end portion of the third pipe 1*c* on an opposite side from an end portion thereof connected to the first pipe 1*a* is connected to a lower portion of the body 30.

The heating medium accommodated in the thermosiphon 1 is water, for example. Water is in a liquid phase at room temperature. At a high temperature, water is boiled and converted to gaseous vapor. Water vapor is condensed into liquid water (condensed water). Thus, both water vapor and condensed water are included in the heating medium. The heating medium in the liquid or gaseous phase flows through the pipes of the thermosiphon 1, and circulates between the heat source HS (the flow path FP) and the engine unit 20.

More specifically, when the heating medium (water herein) in the first pipe 1*a* is heated by the heat source HS (such as the exhaust heat), water is vaporized into water vapor. Water vapor flows from the first pipe 1*a* to the second pipe 1*b* and is introduced into the body 30 of the engine unit 20 from the upper portion of the body 30. Water vapor releases condensed heat to a heater 40, which will be described below, inside the body 30 and the heater 40 is thereby heated. Water vapor that has released the condensed heat is condensed into water (condensed water). Water described above is then discharged from the lower portion of the body 30 and returns to the first pipe 1*a* through the third pipe 1*c*. That is, condensed water flows into the flow path FP of the heat source HS. Thereafter, the above process is repeated. Here, the heating medium, which is accommodated in the thermosiphon 1, may be a liquid other than water (such as alcohol).

Just as described, the thermosiphon 1 receives the heat from the heat source HS for heat exchange with the heater 40. Such a thermosiphon 1 is also referred to as a primary heat exchanger.

(1-2. Configuration of Engine Unit)

The engine unit 20 includes the body 30. The body 30 is a cylinder that accommodates working gas G. The working gas G is helium, for example. Helium has large specific heat capacity. Thus, engine output per unit volume can be increased by increasing a pressure of helium to increase its density. The working gas G may be a gas other than helium (such as air or hydrogen). In the body 30, the heater 40, a cooler 50, and a regenerator 60 are arranged linearly in a horizontal direction.

The heater 40 is configured by a shell-and-tube heat exchanger, for example. In contrast to the thermosiphon 1, which is the primary heat exchanger, the heater 40 is also referred to as a secondary heat exchanger. The heater 40 has a heater pipe 41 through which the working gas G flows. The heater pipe 41 is a metal pipe, for example. A metal constituting the heater pipe 41 may appropriately be selected from metals with excellent thermal conductivity, such as aluminum, copper alloy, and stainless steel. In the present embodiment, a plurality of the heater pipes 41 is provided. However, at least one heater pipe 41 may be provided.

Water vapor, which is introduced into the body 30 from the thermosiphon 1, flows around each of the heater pipes 41. As a result, each of the heater pipes 41 is heated, and thus the working gas G, which flows through each of the heater pipes 41, is heated. That is, the heater 40 gives the heat, which is transferred by the heating medium of the thermosiphon 1, to the working gas G.

One end portion of the heater 40 communicates with an expansion space ES while the other end portion thereof communicates with one end portion of the regenerator 60. That is, in the body 30, the heater 40 is located between the expansion space ES and the regenerator 60. The expansion space ES is a space that is expanded when the working gas G is heated by the heater 40.

The cooler 50 is also configured by a shell-and-tube heat exchanger similar to the heater 40.

More specifically, the cooler 50 has a plurality of cooling pipes 51 through which the working gas G flows. Each of the cooling pipes 51 is a metal pipe similar to the heater pipe 41.

In the present embodiment, the plurality of the cooling pipes 51 is provided. However, at least one cooling pipe 51 may be provided.

When a cooling medium is supplied to the cooler 50 from a cooling facility 70, which is installed outside the body 30, via a cooling medium pipe 71, the cooling medium flows around each of the cooling pipes 51. As a result, each of the cooling pipes 51 is cooled, and thus the working gas G, which flows through each of the cooling pipes 51, is cooled. That is, the cooler 50 cools the working gas G with the cooling medium. The cooling medium described above is water, for example. However, the cooling medium may be other than water. The cooling medium circulates between the cooler 50 and the cooling facility 70 through the cooling medium pipe 71.

One end portion of the cooler 50 communicates with a compression space CS while the other end portion thereof communicates with the other end portion of the regenerator 60. That is, in the body 30, the cooler 50 is located between the regenerator 60 and the compression space CS. The compression space CS is a space where the working gas G is compressed by a compression piston CP, which will be described below.

The regenerator 60 is arranged between the heater 40 and the cooler 50. The regenerator 60 is formed of a mesh-like flow path, for example. In this way, the working gas G in the body 30 can flow between the expansion space ES side and the compression space CS side via the regenerator 60. That is, the regenerator 60 causes the working gas G to flow between the expansion space ES and the compression space CS. Here, the regenerator 60 may not be formed of the mesh-like flow path. Alternatively, the regenerator 60 can be formed of a heat storage material such as a laminated wire mesh, a thin plate along the flow, or a porous body.

In the body 30, an expansion piston EP as a power piston PP is arranged on an opposite side of the expansion space ES from the heater 40. In addition, in the body 30, the compression piston CP as the power piston PP is arranged on an opposite side of the compression space CS from the cooler 50. That is, in the body 30, the expansion piston EP is arranged via the heater 40 and the expansion space ES for the working gas G, and the compression piston CP is arranged via the cooler 50 and the compression space CS for the working gas G. The Stirling engine 100 of a two-piston type, which has the two pistons (the expansion piston EP and the compression piston CP) as the power pistons PP, just as described, is also referred to as an a-type Stirling engine.

A piston ring PR is fitted to an outer circumferential portion of each of the expansion piston EP and the compression piston CP. Each of the piston rings PR serves as a gas seal. That is, the piston rings PR prevent leakage of the working gas G (gas leakage) from a clearance between the expansion piston EP and the body 30 and a clearance between the compression piston CP and the body 30.

An expansion-side piston rod 81 of the expansion piston EP is coupled to an expansion-side crosshead piston 82. The expansion-side crosshead piston 82 is coupled to an expansion-side crankshaft 84 via an expansion-side connecting rod 83. The expansion-side piston rod 81 is provided to penetrate one end surface 30*a* of the body 30. Thus, the expansion-side crosshead piston 82, the expansion-side connecting rod 83, and the expansion-side crankshaft 84 are located outside the body 30.

The expansion-side crosshead piston 82, the expansion-side connecting rod 83, and the expansion-side crankshaft 84 constitute an expansion piston-side crank mechanism 85. The expansion piston EP is coupled to the expansion piston-side crank mechanism 85 via the expansion-side piston rod 81.

On the end surface 30*a* of the body 30, an expansion-side gas seal unit 31*a* is provided around a through hole penetrated by the expansion-side piston rod 81.

A compression-side piston rod 86 of the compression piston CP is coupled to a compression-side crosshead piston 87. The compression-side crosshead piston 87 is coupled to a compression-side crankshaft 89 via a compression-side connecting rod 88. The compression-side piston rod 86 is provided to penetrate another end surface 30*b* of the body 30. Thus, the compression-side crosshead piston 87, the compression-side connecting rod 88, and the compression-side crankshaft 89 are located outside the body 30.

The compression-side crosshead piston 87, the compression-side connecting rod 88, and the compression-side crankshaft 89 constitute a compression piston-side crank mechanism 90. The compression piston CP is coupled to the compression piston-side crank mechanism 90 via the compression-side piston rod 86.

On the other end surface 30*b* of the body 30, a compression-side gas seal unit 31*b* is provided around a through hole penetrated by the compression-side piston rod 86.

The expansion piston-side crank mechanism 85 and the compression piston-side crank mechanism 90 are coupled to each other in a manner to be able to transmit power via a power transmission unit 91. In detail, the expansion-side crankshaft 84 of the expansion piston-side crank mechanism 85 is coupled to an output shaft SH in a manner to be able to transmit the power via a first belt 92. Meanwhile, the compression-side crankshaft 89 of the compression piston-side crank mechanism 90 is coupled to the output shaft SH in a manner to be able to transmit the power via a second belt 93. That is, the first belt 92, the output shaft SH, and the second belt 93 constitute the power transmission unit 91 described above. The power transmission unit 91 may include a chain, a gear, or the like in addition to or instead of the belt.

The output shaft SH is a rotary shaft of a work machine M, for example. The work machine M includes an electric generator and a motor, for example. For example, the work machine M is operated as the motor only at a start, and is operated as the electric generator after autonomous operation.

(1-3. Operation of Engine Unit)

In the above-described configuration, when water vapor, which flows through the first pipe 1*a* and the second pipe 1*b* of the thermosiphon 1, is introduced into the body 30 of the engine unit 20, the condensed heat of water vapor is applied to the heater 40 and thereby heats the heater 40. Due to heating of the heater 40, the working gas G in the heater pipe 41 is heated. As a result, the working gas G is expanded to increase a pressure in the expansion space ES, which in turn presses the expansion piston EP. Here when the pressure in the expansion space ES is $P_E$ (Pa), and a volume of the expansion space ES is $V_E$ ($m^3$), an amount of work $W_E$ (J) in an expansion process is expressed by $W_E=\int P_E \cdot dV_E$.

Due to pressing and movement of the expansion piston EP, the expansion-side piston rod 81 and the expansion-side crosshead piston 82 cause the expansion-side crankshaft 84 to rotate in a positive direction via the expansion-side connecting rod 83. Then, due to the rotation of the expansion-side crankshaft 84, the first belt 92 rotates, and the output shaft SH rotates in the positive direction. When the output shaft SH rotates, the second belt 93 rotates, and the compression-side crankshaft 89 rotates in the positive direction.

Due to the rotation of the compression-side crankshaft 89, the compression-side connecting rod 88 presses the compression-side crosshead piston 87 and the compression-side piston rod 86, and pushes the compression piston CP into the body 30. Consequently, the compression space CS is compressed, the working gas G in the compression space CS enters the cooler 50, and the working gas G is cooled by the cooler 50. Here, when a pressure in the compression space CS is $P_c$ (Pa), and a volume of the compression space CS is $V_c$ ($m^3$), an amount of work $W_C$ (J) in a compression process is expressed by $W_c=-\int P_c \cdot dV_c$.

Thus, when an amount of work for rotating the output shaft SH (for example, electricity generation work) is W (J), the amount of work W is expressed by the following equation using the amount of work $W_E$ in the expansion process, the amount of work $W_C$ in the compression process, and predetermined mechanical efficiency η of the engine unit 20.

$$W=(WE+WC)\cdot\eta=\left(\int PE\cdot dVE-\int PC\cdot dVC\right)\cdot\eta$$

Figure 2:
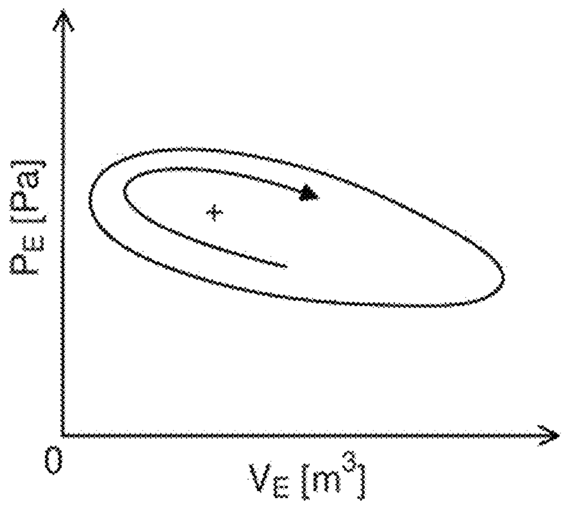
FIG. 2 is an explanatory graph illustrating changes in a pressure and a volume of an expansion space inside a body of the Stirling engine.
Figure 3:
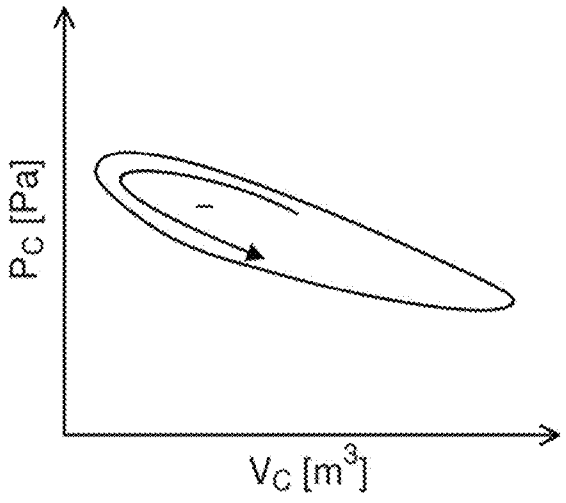
FIG. 3 is an explanatory graph illustrating changes in a pressure and a volume of a compression space inside the body.

Due to the reciprocating movement of the expansion piston EP and the compression piston CP, the expansion process and the compression process, which are described above, are repeatedly executed. At this time, in the expansion space ES, the pressure $P_E$ and the volume $V_E$ are changed as illustrated in FIG. 2. In the compression space CS, the pressure $P_c$ and the volume $V_c$ are changed as illustrated in FIG. 3.

(1-4. Timing)

As described above, power that is applied to the expansion piston-side crank mechanism 85 by the movement of the expansion piston EP illustrated in FIG. 1 is transmitted to the compression piston-side crank mechanism 90 via the first belt 92, the output shaft SH, and the second belt 93.

Here, the expansion piston EP and the compression piston CP reciprocate with a predetermined phase difference in the body 30. The phase difference corresponds to a difference between a crank angle of the expansion piston-side crank mechanism 85 and a crank angle of the compression piston-side crank mechanism 90. Accordingly, for example, when a rotation angle (a crank angle) from a reference position of the expansion-side crankshaft 84 is θ(°), the rotation angle (the crank angle) from the reference position of the compression-side crankshaft 89 is represented by (θ−β), where a phase delay is β(°). The phase delay β is 90°, for example, but is not limited to 90°.

The expansion piston-side crank mechanism 85 and the compression piston-side crank mechanism 90 are timed in advance to cause the above phase difference. Such timings can be set, for example, by coupling the expansion-side crankshaft 84 at a predetermined rotational position to the output shaft SH via the first belt 92 and by coupling the compression-side crankshaft 89 at a predetermined rotational position to the output shaft SH via the second belt 93.

More specifically, each of the expansion-side crankshaft 84 and the first belt 92 has an alignment mark. Each of the compression-side crankshaft 89 and the second belt 93 also has an alignment mark. Accordingly, by coupling the expansion-side crankshaft 84 and the first belt 92 while aligning the marks thereof, and by coupling the compression-side crankshaft 89 and the second belt 93 while aligning the marks thereof, the expansion-side crankshaft 84 can be coupled at the predetermined rotational position to the output shaft SH via the first belt 92, and the compression-side crankshaft 89 can be coupled at the predetermined rotational position to the output shaft SH via the second belt 93. The first belt 92 and the second belt 93 used at this time are preferably toothed belts, that is, timing belts. The timings are set, just as described. That is, the expansion piston-side crank mechanism 85 and the compression piston-side crank mechanism 90 are coupled to each other via the power transmission unit 91 in a manner capable of being timed.

In the present embodiment, the expansion piston-side crank mechanism 85 and the compression piston-side crank mechanism 90 are coupled to each other via the power transmission unit 91 in the manner capable of transmitting the power and being timed. However, the expansion piston-side crank mechanism 85 and the compression piston-side crank mechanism 90 may be coupled in a manner capable of at least transmitting the power or being timed.

2. CONFIGURATION OF MAIN PART OF STIRLING ENGINE

Figure 4:
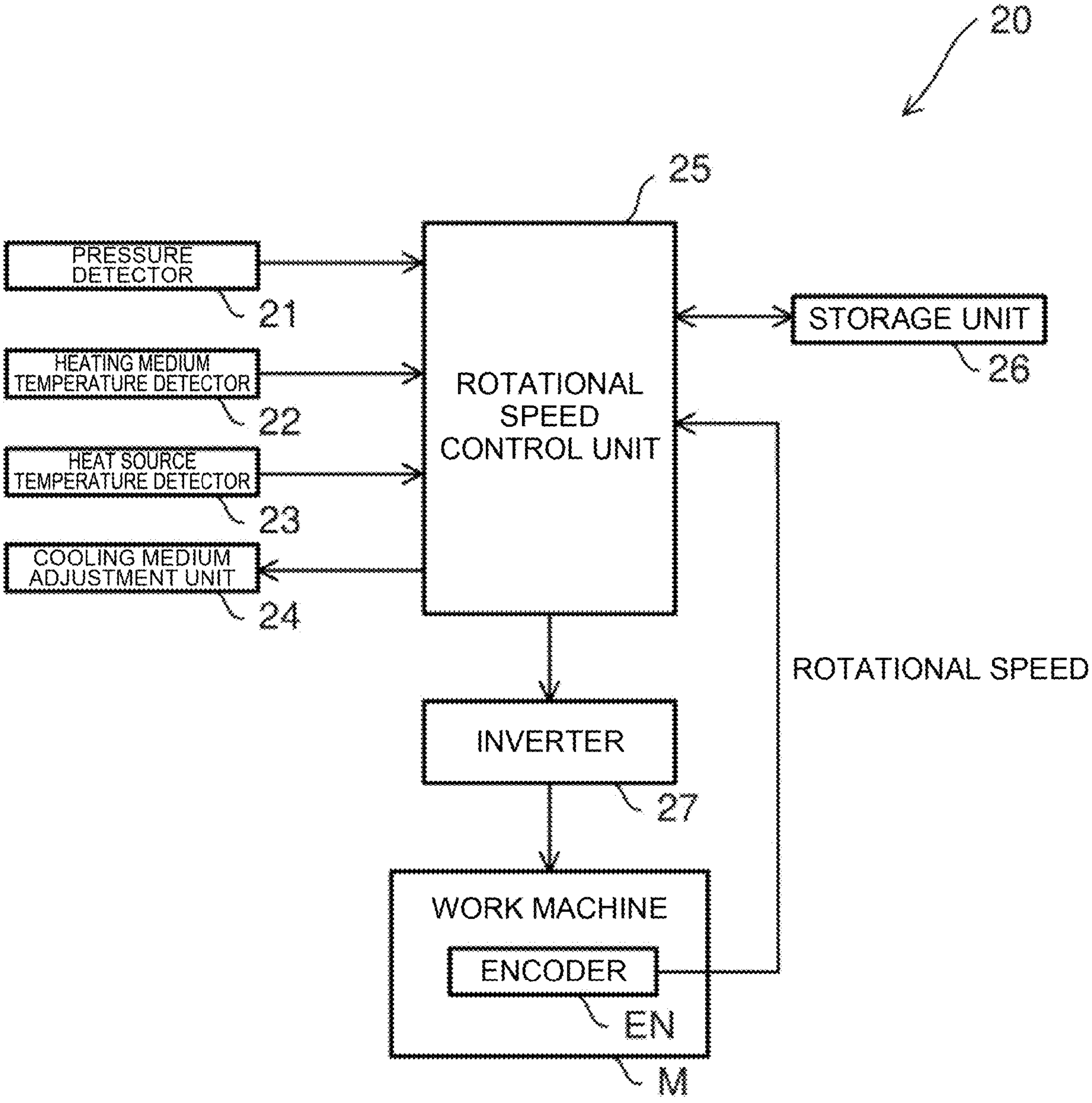
FIG. 4 is a block diagram illustrating a configuration of a main part of the Stirling engine.
Figure 5:
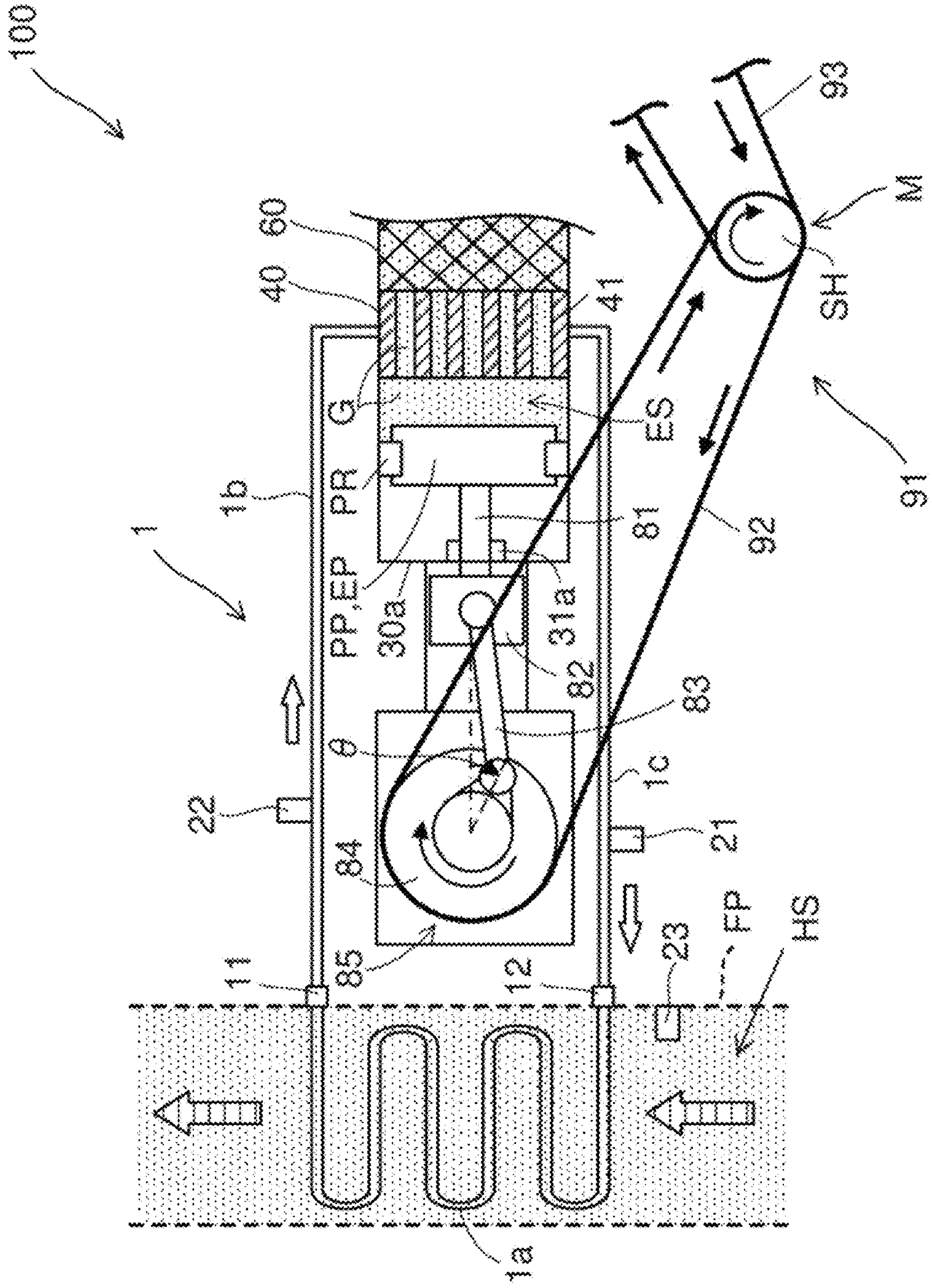
FIG. 5 is an explanatory view illustrating an example of arrangement positions of a pressure detector, a heating medium temperature detector, and a heat source temperature detector provided in the Stirling engine.
Figure 6:
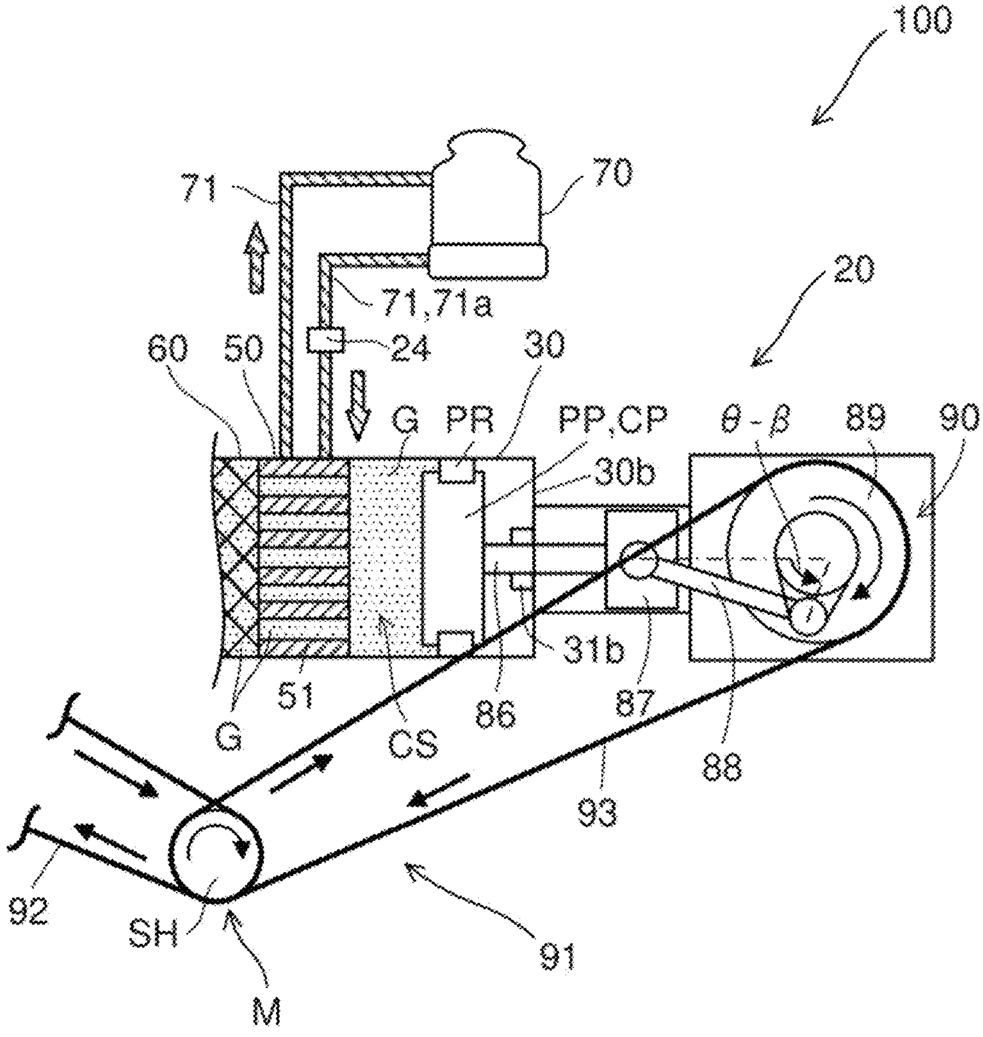
FIG. 6 is an explanatory view illustrating an example of an arrangement position of a cooling medium adjustment unit provided in the Stirling engine.

FIG. 4 is a block diagram illustrating a configuration of a main part of the Stirling engine 100. The Stirling engine 100 in the present embodiment further includes a pressure detector 21, a heating medium temperature detector 22, a heat source temperature detector 23, a cooling medium adjustment unit 24, a rotational speed control unit 25, a storage unit 26, and an inverter 27. FIG. 5 illustrates an example of arrangement positions of the pressure detector 21, the heating medium temperature detector 22, and the heat source temperature detector 23. FIG. 6 illustrates an example of an arrangement position of the cooling medium adjustment unit 24.

The pressure detector 21 is a pressure sensor that detects a pressure of the heating medium in the thermosiphon 1. For example, as illustrated in FIG. 5, in the thermosiphon 1, the pressure detector 21 is attached to the third pipe 1*c*, through which condensed water discharged from the body 30 flows toward the flow path FP of the heat source HS.

The heating medium temperature detector 22 is a temperature sensor that detects a temperature of the heating medium in the thermosiphon 1. For example, in the thermosiphon 1, the heating medium temperature detector 22 is attached to the second pipe 1*b*, through which the heating medium flows from the flow path FP of the heat source HS towards the body 30.

The heat source temperature detector 23 is a temperature sensor that detects a temperature of the heat source HS. The heat source temperature detector 23 is arranged in the flow path FP of the heat source HS. In the present embodiment, a plurality of the heat source temperature detectors 23 is provided. However, the single heat source temperature detector 23 may be provided. Arrangement positions of the heat source temperature detectors 23 will be described below in detail.

The cooling medium adjustment unit 24 adjusts at least one of a water amount and a temperature of the cooling medium. For example, the cooling medium adjustment unit 24 is configured to include at least one of a valve for adjusting the water amount of the cooling medium and a cooler for adjusting the temperature of the cooling medium. As illustrated in FIG. 6, the cooling medium adjustment unit 24 is installed in a cooling medium supply pipe 71*a*, through which the cooling medium flows from the cooling facility 70 toward the cooler 50 in the body 30. The cooling medium supply pipe 71*a* constitutes a part of the cooling medium pipe 71 described above.

The rotational speed control unit 25 controls a rotational speed of the work machine M that is driven by the engine unit 20. In particular, when at least one of the pressure and the temperature of the heating medium exceeds a predetermined value, the rotational speed control unit 25 increases the rotational speed of the work machine M to be higher than the rotational speed at a point when at least one of the pressure and the temperature of the heating medium exceeds the predetermined value. Such a rotational speed control unit 25 is configured by a central processing unit (CPU), for example. The rotational speed control unit 25 can recognize the pressure and the temperature of the heating medium on the basis of the detected results by the pressure detector 21 and the heating medium temperature detector 22 described above. The rotational speed control unit 25 can also recognize the rotational speed at the point when at least one of the pressure and the temperature of the heating medium exceeds the predetermined value on the basis of a detected result by an encoder EN, which will be described below.

Here, the rotational speed of the work machine M refers to a rotational speed of the above-described output shaft SH that serves as the rotary shaft of the work machine M. The rotational speed control unit 25 is connected to the inverter 27. The inverter 27 controls an AC voltage to be supplied to the work machine M on the basis of a control signal (a command value of the rotational speed) that is output from the rotational speed control unit 25, and thereby controls the rotational speed of the output shaft SH of the work machine M. Thus, the rotational speed control unit 25 can control the rotational speed of the work machine M by controlling the inverter 27. Here, the rotational speed control unit 25 and the inverter 27 may be integrated with the work machine M.

The work machine M includes the encoder EN. The encoder EN is a rotational speed detection unit that detects the rotational speed of the rotary shaft (the output shaft SH) of the work machine M. The encoder EN provides feedback on information of the detected rotational speed to the rotational speed control unit 25. In this way, based on the information fed back from the encoder EN, the rotational speed control unit 25 can change (increase, for example) the rotational speed of the work machine M from the rotational speed at a current moment.

The storage unit 26 is memory that stores various types of information, and includes random access memory (RAM), read only memory (ROM), a hard disk, an optical disk, non-volatile memory, or the like. The storage unit 26 temporarily stores the detected values that are detected by the various sensors including the above-described pressure detector 21 and the like. The storage unit 26 also stores various predetermined values, which will be described below.

3. SPECIFIC EXAMPLES OF ROTATIONAL SPEED CONTROL

Hereinafter, specific examples of the rotational speed control by the rotational speed control unit 25 will be described. The rotational speed control unit 25 described above can control the rotational speed of the work machine M by any of the following types of control.

(3-1. First Control)

When the pressure of the heating medium, which is detected by the pressure detector 21, exceeds a first predetermined value as the predetermined value described above, the rotational speed control unit 25 increases the rotational speed of the work machine M (to be higher than the rotational speed at a point when the pressure exceeds the first predetermined value).

When the rotational speed of the engine unit 20 is forcibly increased, the engine unit 20 absorbs more heat transmitted from the thermosiphon 1 via the heating medium. That is, the heat exchange between the heater 40 and the working gas G is promoted, which in turn promotes the heat exchange between the thermosiphon 1 and the engine unit 20 (in particular, the heater 40) via the heating medium. Thus, when the pressure of the heating medium inside the thermosiphon 1 is increased to be higher than the first predetermined value, a pressure increase of the heating medium is suppressed by increasing the rotational speed of the work machine M. Once the pressure of the heating medium is reduced to the first predetermined value or lower, the rotational speed increase control is terminated.

(3-2. Second Control)

When the temperature of the heating medium, which is detected by the heating medium temperature detector 22, exceeds a second predetermined value as the predetermined value described above, the rotational speed control unit 25 increases the rotational speed of the work machine M (to be higher than the rotational speed at a point when the temperature exceeds the second predetermined value).

The rotational speed of the work machine M is increased when the temperature of the heating medium inside the thermosiphon 1 is increased to be higher than the second predetermined value. In such a case, due to the same reason (promotion of the heat exchange) as described above, the temperature increase of the heating medium inside the thermosiphon 1 is suppressed. Once the temperature of the heating medium is reduced to the second predetermined value or lower, the rotational speed increase control is terminated.

(2-3. Third Control)

When the temperature of the heat source HS, which is detected by the heat source temperature detector 23, exceeds a third predetermined value corresponding to the predetermined value described above (such as the first predetermined value), the rotational speed control unit 25 increases the rotational speed of the work machine M (to be higher than the rotational speed at a point when the temperature exceeds the third predetermined value).

When the temperature of the heat source HS exceeds the third predetermined value, it is assumed that the temperature of the heating medium inside the thermosiphon 1, which receives the heat from the heat source HS, exceeds the first predetermined value described above. The rotational speed of the work machine M is increased when the temperature of the heat source HS is increased to be higher than the third predetermined value. In such a case, due to the same reason (the promotion of the heat exchange) as described above, the temperature increase of the heating medium inside the thermosiphon 1, which receives the heat from the heat source HS, is suppressed.

In the third control, the rotational speed increase control is continuously executed unless the temperature of the heat source HS is reduced to the third predetermined value or lower. For example, at least one of the second control and the first control may be used together with the third control to directly monitor the temperature or the pressure of the heating medium. In this case, even in the case where the temperature of the heat source HS exceeds the third predetermined value, the rotational speed increase control can be terminated when the temperature of the heating medium is reduced to the second predetermined value or lower or when the pressure of the heating medium is reduced to the first predetermined value or lower.

As it has been described so far, in the present embodiment, when at least one of the pressure and the temperature of the heating medium accommodated in the thermosiphon 1 exceeds the predetermined value, which is set in advance, the output of the engine unit 20 is increased to be higher than the output at a point when at least one of the pressure and the temperature of the heating medium exceeds the predetermined value (the first to third control). More specifically, the rotational speed control unit 25 increases the rotational speed of the work machine M to be higher than the rotational speed at the point when at least one of the pressure and the temperature of the heating medium exceeds the predetermined value.

The heating medium is released to the outside of the thermosiphon 1 when at least one of the pressure and the temperature (hereinafter, also referred to as the pressure or the like) of the heating medium is increased. In this case, as described above, an amount of the heating medium filling inside the thermosiphon 1 is reduced, which possibly damages the thermosiphon 1. In the present embodiment, even when the pressure or the like of the heating medium is increased, the increase in the pressure or the like of the heating medium can be suppressed by any of the first to third control without releasing the heating medium inside the thermosiphon 1 to the outside. As a result, it is possible to avoid the damage to the thermosiphon 1, which is caused by releasing the heating medium to the outside.

(3-4. Fourth Control)

When at least one of the pressure and the temperature of the heating medium exceeds the predetermined value, which is set in advance, the rotational speed control unit 25 may increase the rotational speed of the work machine M by controlling at least one of the water amount and the temperature of the cooling medium for cooling the cooler 50. More specifically, when at least one of the pressure and the temperature of the heating medium exceeds the predetermined value, the rotational speed control unit 25 increases the water amount of the cooling medium from a specified value, which is set in advance, or reduces the temperature of the cooling medium from a set value, which is set in advance, and thereby increases the rotational speed of the work machine M to be higher than the rotational speed at the point when at least one of the pressure and the temperature of the heating medium exceeds the predetermined value. The rotational speed control unit 25 can respectively recognize the pressure and the temperature of the heating medium on the basis of the detected values by the pressure detector 21 and the heating medium temperature detector 22.

When the water amount of the cooling medium is increased, or when the temperature of the cooling medium is reduced, the temperature of the working gas G, which is cooled by the cooling medium, is reduced. In this way, it is possible to promote the heat exchange between the heating medium and the working gas G in the heater 40. As a result, the rotational speed of the work machine M can be increased. Thus, instead of the first to third control described above, the damage to the thermosiphon 1 may be avoided by controlling at least one of the water amount and the temperature of the cooling medium to suppress the temperature increase of the heating medium.

In particular, in the configuration that the engine unit 20 includes the cooling medium adjustment unit 24, the rotational speed control unit 25 may increase the rotational speed of the work machine M by controlling the cooling medium adjustment unit 24 when at least one of the pressure and the temperature of the heating medium exceeds the predetermined value. On the contrary, in the configuration that the engine unit 20 does not include the cooling medium adjustment unit 24, the rotational speed control unit 25 may change the water amount or the temperature of the cooling medium by directly controlling the cooling facility 70.

7. ARRANGEMENT OF HEAT SOURCE TEMPERATURE DETECTOR

Figure 7:
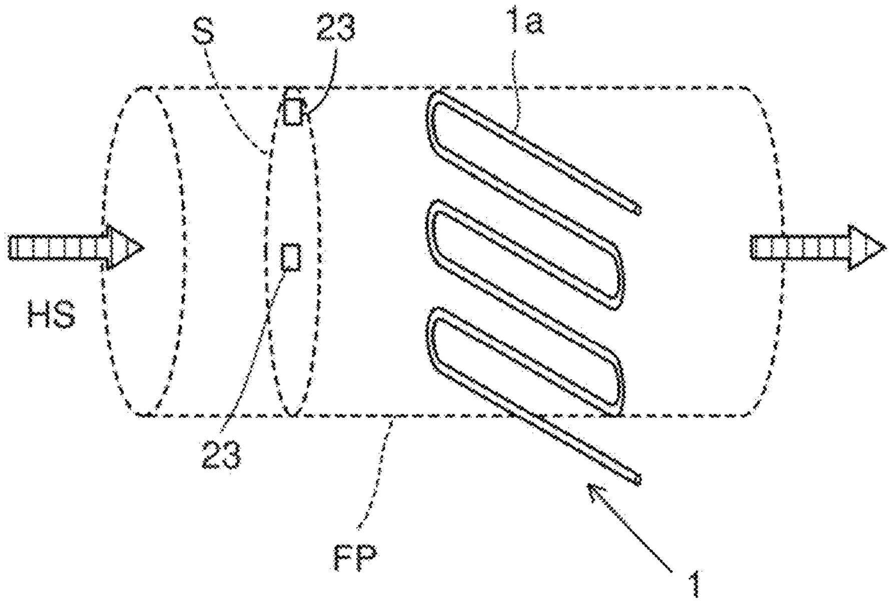
FIG. 7 is a perspective view schematically illustrating a positional relationship between a flow path of a heat source and a thermosiphon.
Figure 8:
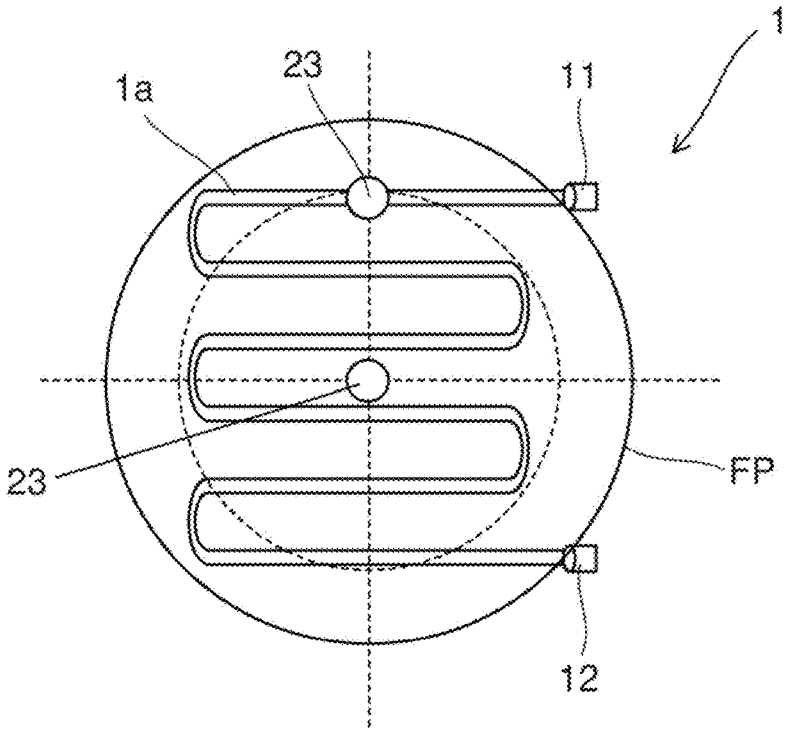
FIG. 8 is an explanatory view schematically illustrating an example of a positional relationship between each of the plural heat source temperature detectors and the thermosiphon.

FIG. 7 is a perspective view schematically illustrating a positional relationship between the flow path FP of the heat source HS and the thermosiphon 1. FIG. 8 is an explanatory view schematically illustrating an example of a positional relationship between each of the plural heat source temperature detectors 23 and the thermosiphon 1 that is seen from an upstream side of the flow path FP. FIG. 8 illustrates a case where the two heat source temperature detectors 23 are provided. In FIG. 7, a surface on which the two heat source temperature detectors 23 are located is denoted by S.

In the third control described above, the rotational speed control unit 25 desirably determines the temperature of the heat source HS on the basis of plural detected temperatures by the plural heat source temperature detectors 23. For example, as illustrated in FIG. 8, when the number of the heat source temperature detectors 23 is two and the detected temperatures by the heat source temperature detectors 23 are T1 (° C.) and T2 (° C.), the rotational speed control unit 25 can calculate $T=(T1+T2)/2$ to obtain a temperature T of the heat source HS to be compared with the third predetermined value.

The single heat source temperature detector 23 may be provided. However, in this case, the safe predetermined value (the third predetermined value) has to be set, and thus, the predetermined value has to be set low. Meanwhile, by providing the plural heat source temperature detectors 23, an average value of the heat source temperatures can be calculated and compared with the predetermined value as described above. Thus, reliability of the heat source temperature to be compared with the predetermined value is improved, and there is no necessity to set the safe predetermined value that is sufficiently low. By increasing the predetermined value, an upper limit temperature of the heat source HS, at which the optimum rotational speed can be maintained, is increased, and a total work load (an electricity generation amount) is increased. Thus, from such a perspective, the rotational speed control unit 25 desirably determines the temperature T of the heat source HS on the basis of the detected temperatures by the plural heat source temperature detectors 23.

In particular, as illustrated in FIG. 8, one of the two heat source temperature detectors 23 is arranged at a radial center of the flow path FP, and the other thereof is arranged on a radially outer side in the flow path FP. This is desirable to realize the rotational speed control, for which variations in the temperature of the heat source HS and a detection error of the temperature of the heat source HS in the radial direction of the flow path FP are taken into consideration.

Figure 9:
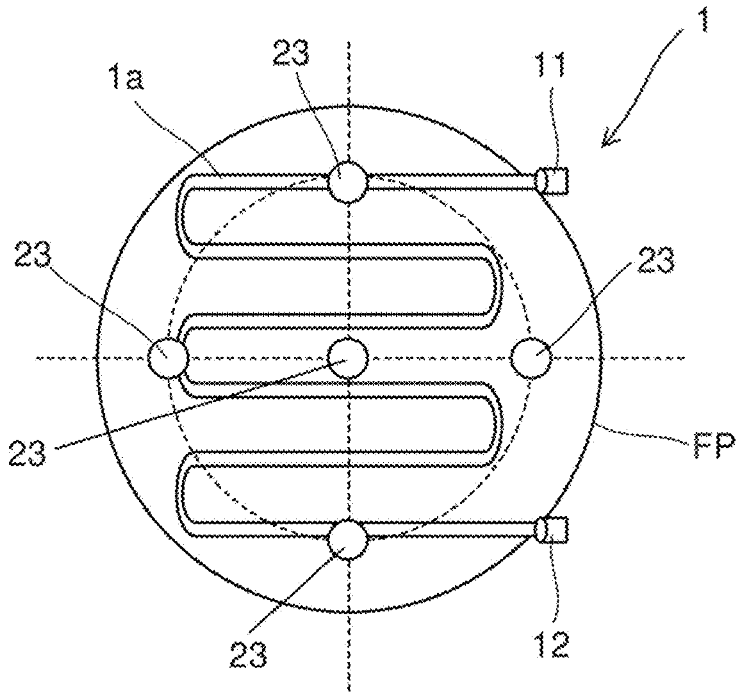
FIG. 9 is an explanatory view schematically illustrating another example of the above positional relationship.
Figure 10:
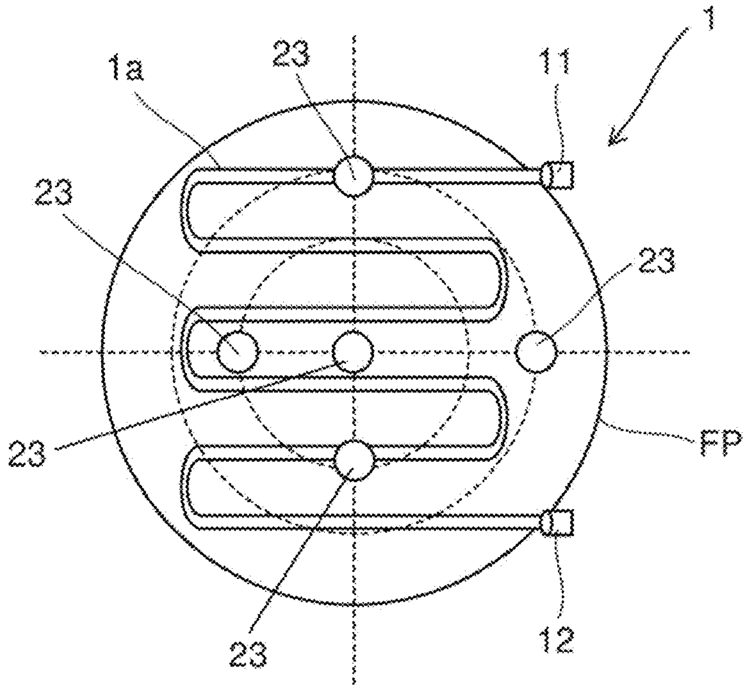
FIG. 10 is an explanatory view schematically illustrating further another example of the above positional relationship.

FIG. 9 and FIG. 10 are explanatory views schematically illustrating another example of the positional relationship between each of the plural heat source temperature detectors 23 and the thermosiphon 1 that is seen from the upstream side of the flow path FP. FIG. 9 and FIG. 10 each illustrate a case where the five heat source temperature detectors 23 are provided. As illustrated in FIG. 9, of the plural heat source temperature detectors 23, one may be arranged at the radial center of the flow path FP, and the rest may be arranged at positions with the same radial distance from the flow path center in the flow path FP. Alternatively, as illustrated in FIG. 10, of the plural heat source temperature detectors 23, one may be arranged at the radial center of the flow path FP, and at least one of the rest may be arranged at a position in the flow path FP where a radial distance from the flow path center differs from distances of the others.

By the way, the temperature of the heat source HS is higher in a portion of the flow path FP, through which the heat source HS moves, on the upstream side of the thermosiphon 1 than in a portion of the flow path FP on a downstream side of the thermosiphon 1. This is because, on the downstream side of the thermosiphon 1, the heat of the heat source HS is transferred to the heating medium in the thermosiphon 1, and thus the temperature of the heat source HS is reduced. In order to accurately monitor an influence of the heat of the heat source HS on the heating medium, it is desired to detect the higher temperature of the heat source HS than the lower temperature thereof and execute the above-described rotational speed control on the basis of the detected temperature. From this perspective, as illustrated in FIG. 7, the plural heat source temperature detectors 23 are desirably arranged on the upstream side of the thermosiphon 1 in the flow path FP.

5. SUPPLEMENT

In the present embodiment, as illustrated in FIG. 1, the expansion piston EP and the heater 40 are arranged linearly in a motion direction of the expansion piston EP in the body 30. In addition, the cooler 50 and the compression piston CP are arranged linearly in a motion direction of the compression piston CP in the body 30. Here, the motion direction of the expansion piston EP refers to a direction in which the expansion piston EP reciprocates in the body 30 due to the expansion of the working gas G in the body 30 and the rotation of the expansion-side crankshaft 84. Meanwhile, the motion direction of the compression piston CP refers to a direction in which the compression piston CP reciprocates in the body 30 due to the expansion of the working gas G in the body 30 and the rotation of the compression-side crankshaft 89. In this case, the entire expansion space ES between the expansion piston EP and the heater 40 can contribute to pressing of the expansion piston EP. In addition, the entire compression space CS between the cooler 50 and the compression piston CP can contribute to drawing of the compression piston CP. Thus, an invalid space that does not contribute to pressing of the expansion piston EP does not exist in the expansion space ES. An invalid space that does not contribute to drawing of the compression piston CP does not exist in the compression space CS, either. As a result, by heating the working gas G with the heater 40 and cooling the working gas G with the cooler 50, it is possible to efficiently drive the Stirling engine 100 (particularly, the engine unit 20) and increase the output of the engine unit 20 (more specifically, the rotational speed of the output shaft SH).

Therefore, from a perspective of reducing the invalid spaces to increase the output of the engine unit 20, it is desired to linearly arrange the expansion piston EP and the heater 40 in the body 30 and also linearly arrange the cooler 50 and the compression piston CP in the body 30.

In the case where the flow path in the body 30 has a bent portion, it is concerned that pressure loss occurs in the bent portion, which causes the reduction in the output of the engine unit 20. From a perspective of avoiding the reduction in the output of the engine unit 20 caused by the pressure loss, as illustrated in FIG. 1, the expansion piston EP, the heater 40, the cooler 50, and the compression piston CP are desirably arranged linearly in the body 30.

When more importance is placed on relization of a compact layout than the reduction in the output of the engine unit 20 caused by the pressure loss, the body 30 may be configured to have the bent portion. For example, in the case where the regenerator 60 extends in one direction in the body 30, the expansion piston EP and the heater 40 may be arranged side-by-side in a direction intersecting the one direction in the body 30, and the cooler 50 and the compression piston CP may also be arranged side-by-side in the direction intersecting the one direction in the body 30. That is, a pair of the expansion piston EP and the heater 40 and a pair of the cooler 50 and the compression piston CP may be arranged side-by-side in parallel.

6. MODIFIED EMBODIMENTS

In the Stirling engine 100, which has been described so far, when at least one of the pressure and the temperature of the heating medium exceeds the predetermined value, the rotational speed control unit 25 increases the rotational speed of the work machine M and thereby increases the output of the engine unit 20. Due to the increase in the output of the engine unit 20, in the engine unit 20, an absorbed amount of thermal energy from the heating medium, which flows inside the thermosiphon 1, is increased. In this way, the increase in the pressure or the like of the heating medium can be suppressed. Thus, it can also be said that, in the Stirling engine 100, which has been described so far, when at least one of the pressure and the temperature of the heating medium exceeds the predetermined value, the rotational speed control unit 25 executes control for increasing the absorbed amount of the thermal energy from the heating medium. At this time, the control for increasing the absorbed amount is control for increasing the output of the engine unit 20, more specifically, control for increasing the rotational speed of the work machine M.

When at least one of the pressure and the temperature of the heating medium exceeds the predetermined value, the control for increasing the absorbed amount of the thermal energy from the heating medium is not limited to the above-described control for increasing the output of the engine unit 20. Hereinafter, another example of the control for increasing the absorbed amount of the thermal energy will be described as modified embodiments.

Figure 11:
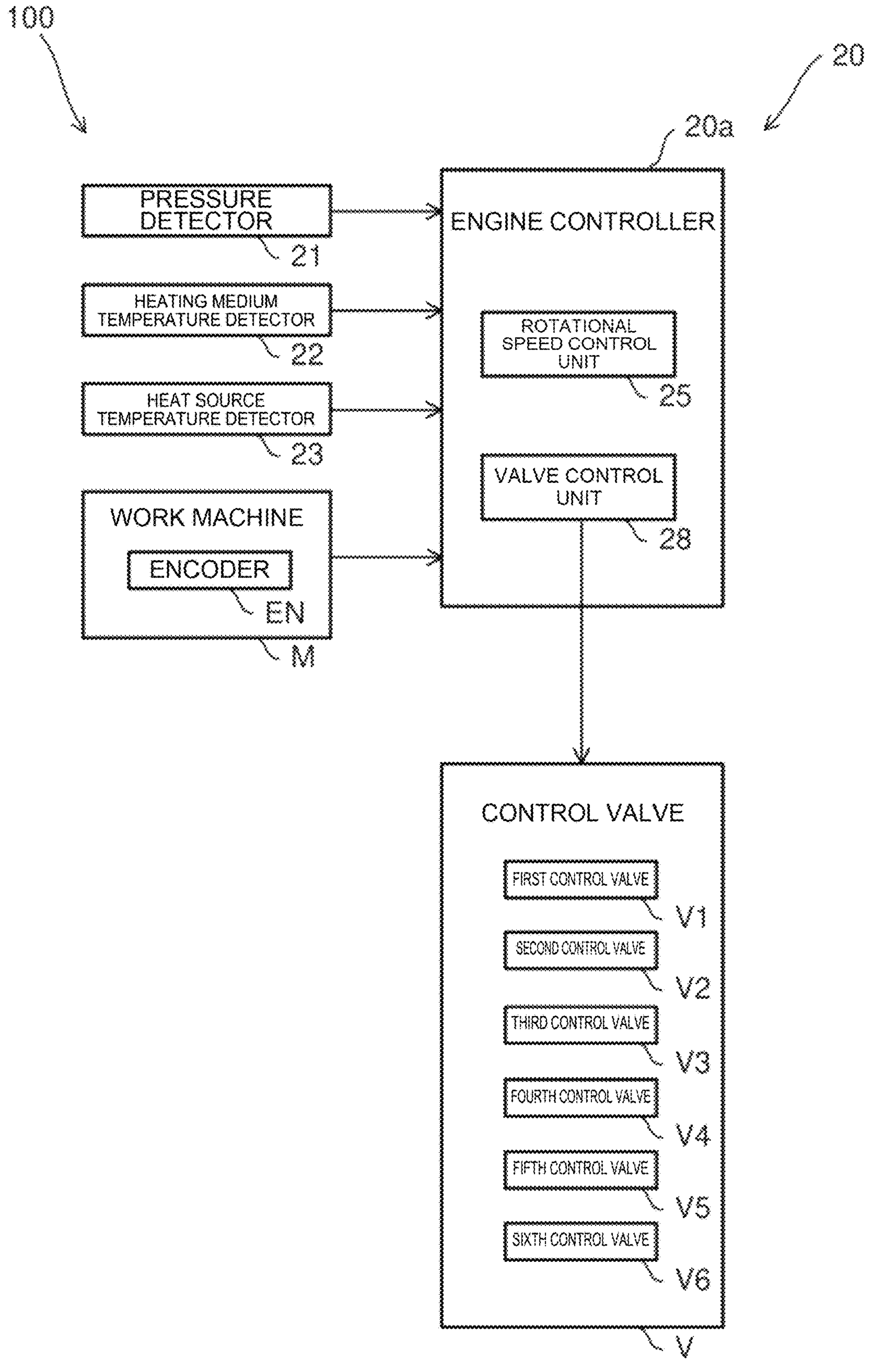
FIG. 11 is a block diagram illustrating a configuration of a main part of a Stirling engine according to a modified embodiment.

FIG. 11 is a block diagram illustrating a configuration of a main part of a Stirling engine 100 according to the modified embodiment. As illustrated in FIG. 11, the Stirling engine 100 includes an engine controller 20*a*. When at least one of the pressure and the temperature of the heating medium exceeds the predetermined value, the engine controller 20*a* executes the control for increasing the absorbed amount of the thermal energy from the heating medium (to be larger than the absorbed amount at the point when at least one of the pressure and the temperature of the heating medium exceeds the predetermined value). Here, the engine controller 20*a* can determine whether at least one of the pressure and the temperature of the heating medium exceeds the predetermined value on the basis of the detected result by at least any of the pressure detector 21, the heating medium temperature detector 22, and the heat source temperature detector 23 described above.

Such an engine controller 20*a* is configured to include the above-described rotational speed control unit 25 and a valve control unit 28. The valve control unit 28 is a controller that controls opening/closing (switching) of a control valve V described below, and includes a CPU, for example, similar to the rotational speed control unit 25.

However, the rotational speed control unit 25 alone can constitute the engine controller 20*a*.

For example, the rotational speed control unit 25 illustrated in FIG. 4 alone constitutes the engine controller 20*a*. Similarly, the valve control unit 28 alone can constitute the engine controller 20*a*. Thus, the engine controller 20*a* may only include at least one of the rotational speed control unit 25 and the valve control unit 28.

The control valve V is provided in a path through which a fluid flows. Here, the fluid is the heating medium or the cooling medium. The control valve V switches between inflow and inhibition of the inflow of the fluid into the path on the basis of control by the valve control unit 28. Such a control valve V is an electromagnetic valve or an electromagnetic proportional valve, for example. The control valve V includes at least one of a first control valve V1, a second control valve V2, a third control valve V3, a fourth control valve V4, a fifth control valve V5, and a sixth control valve V6. Hereinafter, a description will be made on a configuration and the control for increasing the absorbed amount of the thermal energy from the heating medium when the pressure or the like of the heating medium exceeds the predetermined value, in addition to arrangement of each of the control valves V.

6-1. First Modified Embodiment

Figure 12:
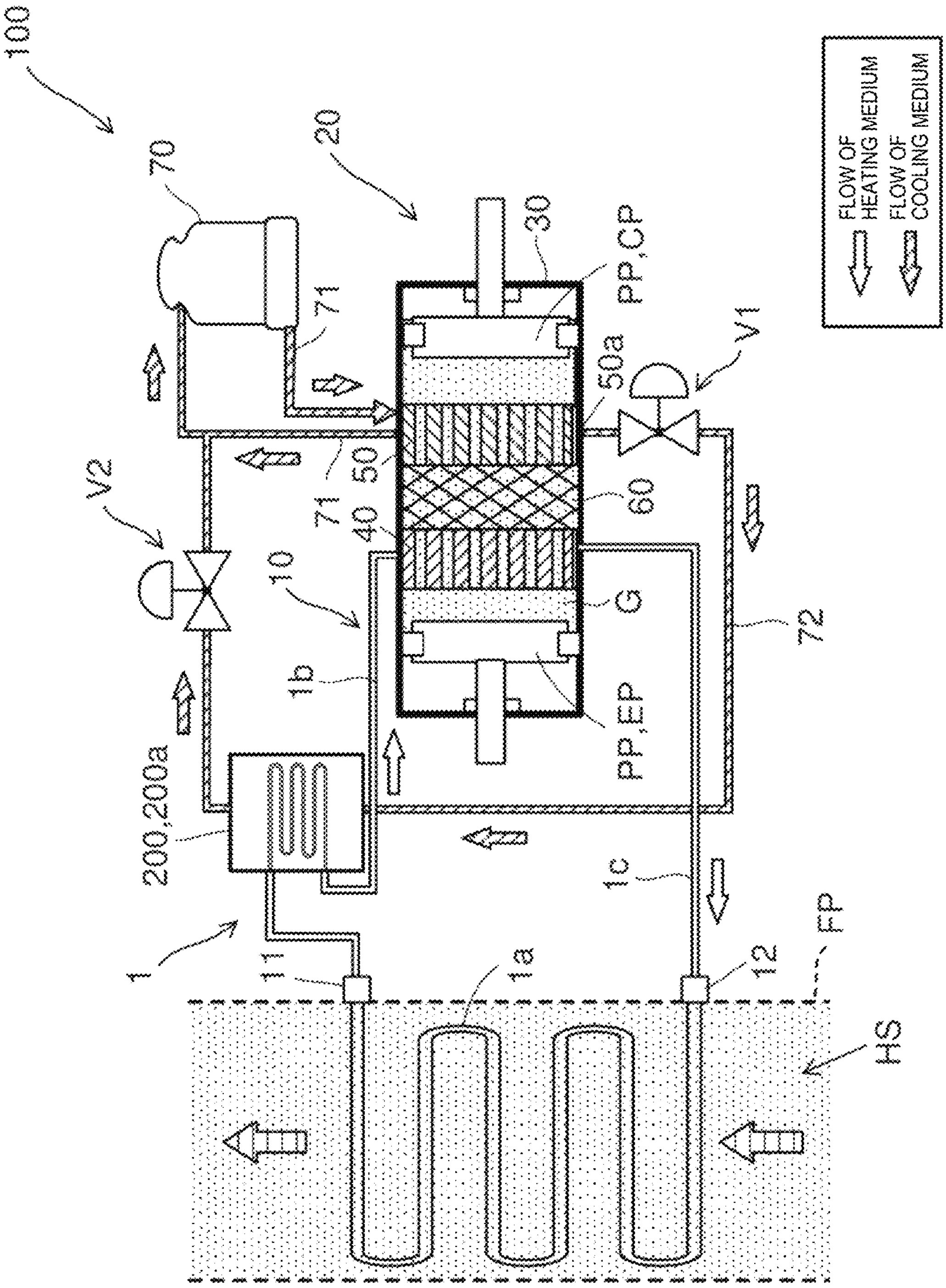
FIG. 12 is an explanatory view schematically illustrating an outline configuration of a Stirling engine according to a first modified embodiment.

FIG. 12 is an explanatory view schematically illustrating an outline configuration of a Stirling engine 100 according to a first modified embodiment. In the Stirling engine 100 of the first modified embodiment, a heat exchanger 200 is arranged in the middle of the heating medium circulation path 10 through which the heating medium circulates via the heater 40. Then, a coolant circulation path 72, through which a coolant for cooling the heating medium flows via the heat exchanger 200, is provided, and the first control valve V1 and the second control valve V2 are arranged in the middle of the coolant circulation path 72. Otherwise, the configuration is the same as that illustrated in FIG. 1. In FIG. 12, a part of the configuration illustrated in FIG. 1 is not illustrated for convenience. More specifically, the configuration on the expansion piston-side crank mechanism 85 of the body 30 of the engine unit 20 and the configuration on the compression piston-side crank mechanism 90 thereof are not illustrated, and the power transmission unit 91 is not illustrated. Such a way of illustration is applied to the drawings described below.

The heat exchanger 200 includes a condenser 200*a* that condenses the heating medium through cooling. Similar to the first pipe 1*a*, the heat exchanger 200 has a folded structure in which a pipe through which the heating medium flows is folded a plurality of times. With the folded structure of the pipe, the pipe is increased in length, which increases an area for transferring heat of the heating medium flowing through the pipe. In this way, in the heat exchanger 200, the thermal energy from the heating medium can be absorbed efficiently.

The heating medium circulation path 10 includes the first pipe 1*a*, the second pipe 1*b*, and the third pipe 1*c* described above. In the first modified embodiment, the heat exchanger 200 is provided in the middle of the second pipe 1*b*. That is, the heat exchanger 200 is provided on an upstream side of the heater 40 in a flow direction of the heating medium flowing through the heating medium circulation path 10.

The coolant circulation path 72 is a pipe through which the cooling medium (the coolant) flows from a cooling medium outlet 50*a* of the cooler 50 toward the cooling facility 70, and is provided separately from the above-described cooling medium pipe 71. The coolant that flows through the coolant circulation path 72 cools the heating medium in the heat exchanger 200 and then returns to the cooling facility 70.

The first control valve V1 is provided between the cooling medium outlet 50*a* and the heat exchanger 200 in the coolant circulation path 72. The second control valve V2 is provided between the heat exchanger 200 and the cooling facility 70 in the coolant circulation path 72. Here, the cooling facility 70 includes a pump for discharging the cooling medium therein. The pump may be provided outside the cooling facility 70 (for example, in the cooling medium pipe 71 or the coolant circulation path 72).

The heating medium (water vapor) that flows from the first pipe 1*a* toward the second pipe 1*b* of the heating medium circulation path 10 flows through the heat exchanger 200 provided in the second pipe 1*b* and is guided to the upper portion of the body 30. In the body 30, the heating medium releases the condensed heat to the heater 40, whereby the heater 40 is heated. The heating medium that has released the condensed heat is condensed into water, is discharged from the lower portion of the body 30, and returns to the first pipe 1*a* through the third pipe 1*c*.

Here, when at least one of the pressure and the temperature of the heating medium in the heating medium circulation path 10 exceeds the predetermined value, the valve control unit 28 electrically controls the first control valve V1 and the second control valve V2 to open the first control valve V1 and the second control valve V2. Then, in the coolant circulation path 72, the coolant that is discharged from the cooling medium outlet 50*a* flows toward the heat exchanger 200 via the first control valve V1, and cools the heating medium flowing through the heat exchanger 200. That is, in the heat exchanger 200, the thermal energy of the heating medium is absorbed. In other words, the absorbed amount of the thermal energy in the heat exchanger 200 is increased to be larger than the absorbed amount at the point when at least one of the pressure and the temperature of the heating medium exceeds the predetermined value (the absorbed amount at this point is zero). The coolant that has cooled the heating medium flows through the coolant circulation path 72 via the second control valve V2 and returns to the cooling facility 70.

Meanwhile, when the pressure or the like of the heating medium is reduced to the predetermined value or lower, the valve control unit 28 electrically controls the first control valve V1 and the second control valve V2 to close the first control valve V1 and the second control valve V2. In this case, the cooling medium no longer flows into the heat exchanger 200 via the coolant circulation path 72. Thus, the thermal energy from the heating medium is hardly absorbed in the heat exchanger 200.

As described above, in the first modified embodiment, when the pressure or the like of the heating medium exceeds the predetermined value, the engine controller 20*a* (in particular, the valve control unit 28) executes the control for increasing the absorbed amount of the thermal energy from the heating medium (in the heat exchanger 200). Due to the increase in the absorbed amount of the thermal energy, the increase in the pressure or the like of the heating medium can be suppressed without increasing the engine output and without releasing the heating medium to the outside. In this way, it is possible to avoid the damage to the thermosiphon 1, which is caused by the increase in the pressure or the like of the heating medium.

In particular, the control for increasing the absorbed amount is cooling control for the heating medium by the heat exchanger 200, which is provided in the middle of the heating medium circulation path 10 through which the heating medium flows via the heater 40. By cooling the heating medium in the heat exchanger 200, that is, by absorbing surplus energy (thermal energy) of the heating medium in the heat exchanger 200, the increase in the pressure or the like of the heating medium is reliably suppressed.

The coolant for cooling the heating medium in the condenser 200*a*, which constitutes the heat exchanger 200, is the cooling medium supplied from the cooling medium outlet 50*a* of the cooler 50. Since the cooling medium is used not only as cooling water for cooling the cooler 50 but also as the coolant for condensing the heating medium (water vapor) through cooling in the condenser 200*a*, the cooling medium can be used effectively.

6-2. Second Modified Embodiment

Figure 13:
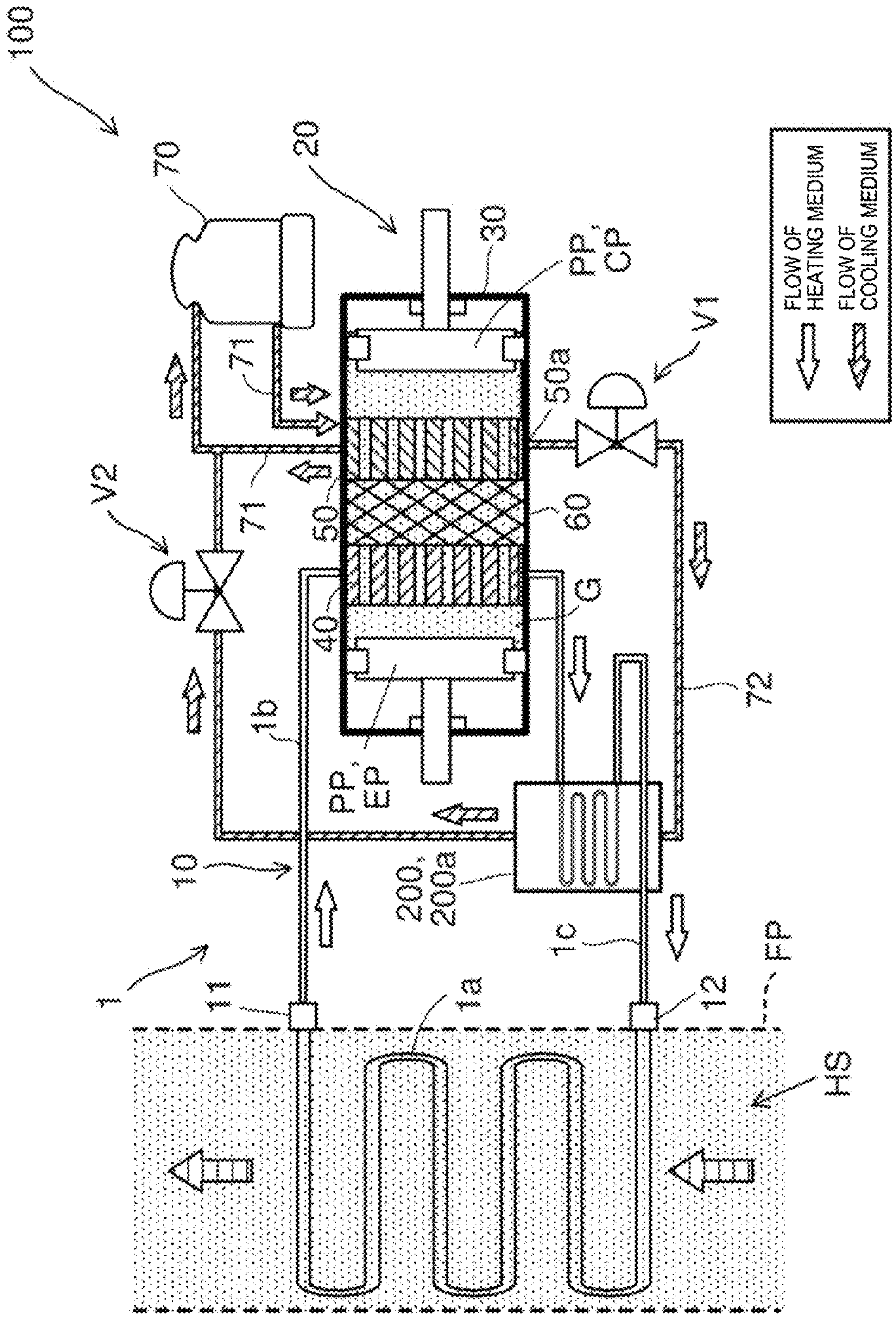
FIG. 13 is an explanatory view schematically illustrating an outline configuration of a Stirling engine according to a second modified embodiment.

FIG. 13 is an explanatory view schematically illustrating an outline configuration of a Stirling engine 100 according to a second modified embodiment. The Stirling engine 100 of the second modified embodiment has the same configuration as that in the first modified embodiment, except that the arrangement position of the heat exchanger 200 (the condenser 200*a*) is changed. More specifically, in the Stirling engine 100 of the second modified embodiment, the heat exchanger 200 is provided in the middle of the third pipe 1*c* of the heating medium circulation path 10. That is, the heat exchanger 200 is provided on a downstream side of the heater 40 in the flow direction of the heating medium flowing through the heating medium circulation path 10. Here, the opening/closing control (the switching control) of the first control valve V1 and the second control valve V2 is the same as that in the first modified embodiment.

As in the first modified embodiment, in the configuration that the heat exchanger 200 is provided on the upstream side of the heater 40 in the heating medium circulation path 10, the heat exchanger 200 is supplied with the heating medium, which has received the heat from the heat source HS, in a gaseous (water vapor) phase. Here, when a mass flow rate of the fluid is constant, a flow velocity of the water vapor, which is the gas, at the time of flowing through the pipe is higher than that of water, which is the liquid. For this reason, when the pipe length is increased due to the folded structure of the pipe in the heat exchanger 200, the pressure loss is increased, which hinders the flow of water vapor through the pipe. As a result, during normal operation of the engine unit 20, the heating medium is less likely to be supplied to the heater 40, and thus degraded performance (output) during the normal operation is concerned.

To handle the above, as in the second modified embodiment, in the configuration that the heat exchanger 200 is provided on the downstream side of the heater 40 in the heating medium circulation path 10, the heat exchanger 200 is supplied with the liquid heating medium (such as water) that is condensed by releasing the condensed heat in the heater 40. Here, when the mass flow rate of the fluid is constant, the flow velocity of the water, which is the liquid, at the time of flowing through the pipe is lower than that of water vapor, which is the gas. For this reason, even when the pipe length is increased due to the folded structure of the pipe in the heat exchanger 200, the pressure loss is not increased, and the heating medium (water) easly flows through the pipe. Thus, during the normal operation of the engine unit 20, the heating medium is easily supplied to the heater 40, and it is thus possible to suppress degradation of the performance (output) of the engine unit 20, which is the concern in the first modified embodiment.

Figure 14:
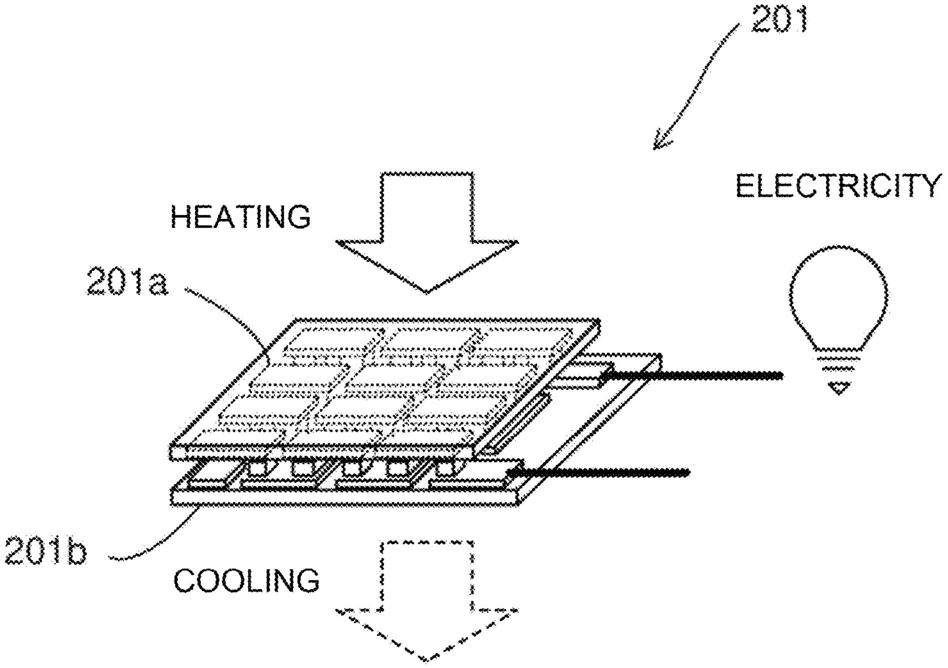
FIG. 14 is a perspective view schematically illustrating a thermoelectric element applicable to the first and second modified embodiments.

FIG. 14 is a perspective view schematically illustrating a thermoelectric element 201 applicable to the first and second modified embodiments. It may be configured that the thermoelectric element 201 is arranged near the pipe of the heat exchanger 200 described in the first and second modified embodiments and the electricity may be drawn from the thermoelectric element 201. The thermoelectric element 201 is an element that converts the thermal energy into electric energy. For example, one surface 201*a* of the thermoelectric element 201 is heated with the heat of the heating medium flowing through the pipe of the heat exchanger 200, and the other surface 201*b* is cooled.

When there is a temperature difference between the one surface 201*a* and the other surface 201*b*, just as described, such a phenomenon occurs that an electromotive force is generated to cause a current flow (Seebeck effect). As described above, by providing the thermoelectric element 201, the surplus energy (thermal energy) of the heating medium can be converted into the electric energy for use.

6-3. Third Modified Embodiment

Figure 15:
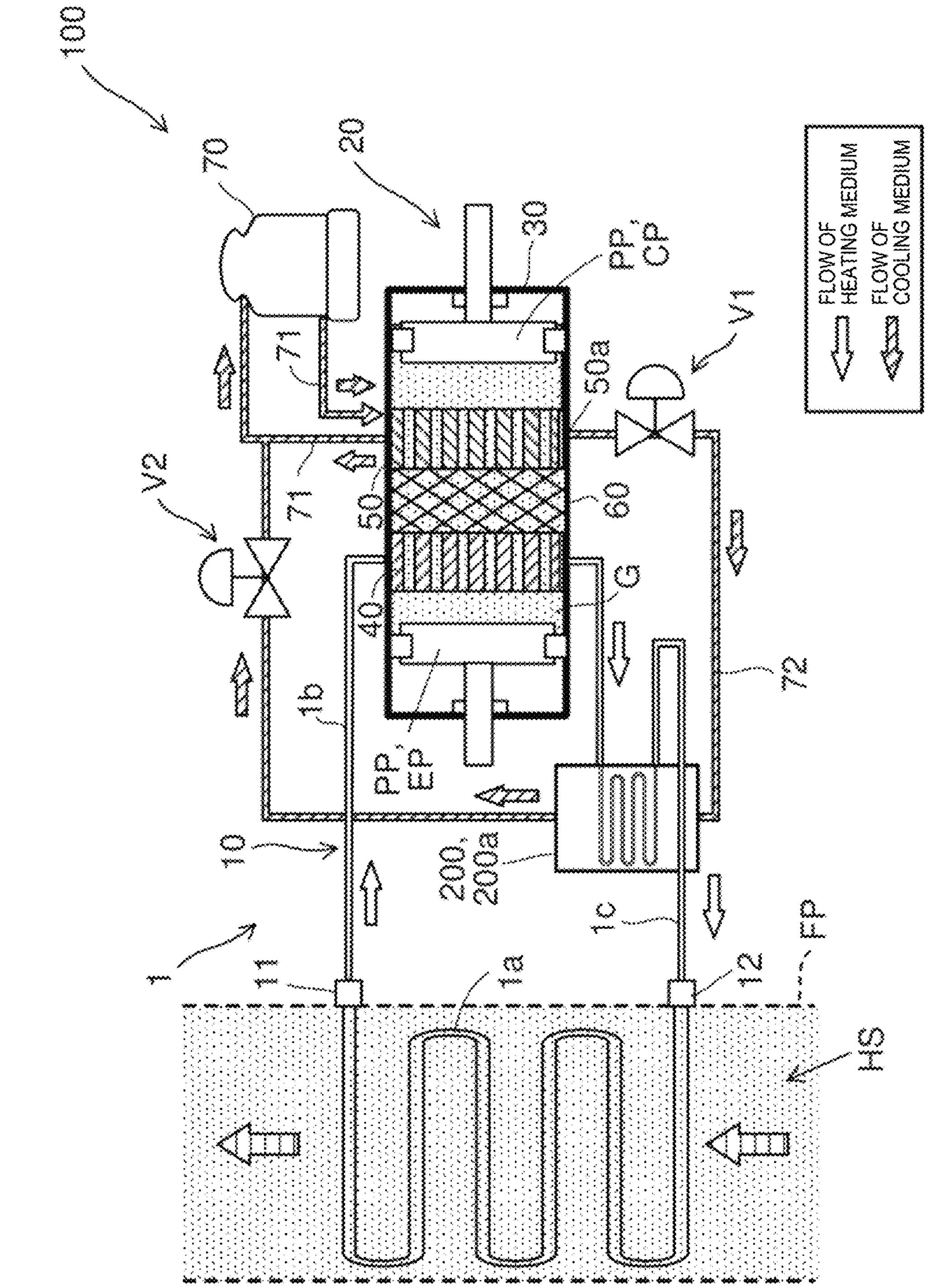
FIG. 15 is an explanatory view schematically illustrating an outline configuration of a Stirling engine according to a third modified embodiment.

FIG. 15 is an explanatory view schematically illustrating an outline configuration of a Stirling engine 100 according to a third modified embodiment. The Stirling engine 100 of the third modified embodiment has the same configuration as that in the second modified embodiment, except that a heater bypass path 1*d* and the third control valve V3 are provided in the heating medium circulation path 10.

The heater bypass path 1*d* is branched and extends from the second pipe 1*b*, and is connected to the third pipe 1*c*. Thus, the heater bypass path 1*d* is provided in a manner to bypass the heater 40. The third control valve V3 is a heater bypass path switching valve that switches between inflow and inhibition of the inflow of the heating medium from the second pipe 1*b* to the heater bypass path 1*d*. The third control valve V3 is provided in the middle of the heater bypass path 1*d*. Here, it is assumed that the third control valve V3 is an electromagnetic valve. Just as described, the heating medium circulation path 10 includes: the heater bypass path 1*d* that bypasses the heater 40; and the third control valve V3 as the heater bypass path switching valve.

In the configuration of the third modified embodiment, when at least one of the pressure and the temperature of the heating medium exceeds the predetermined value, the valve control unit 28 (see FIG. 11) of the engine controller 20*a* electrically controls the third control valve V3 to open the third control valve V3. As a result, the heating medium that flows through the second pipe 1*b* is not supplied to the heater 40, but flows into the heater bypass path 1*d* via the third control valve V3 and is supplied to the heat exchanger 200. When the pressure or the like of the heating medium is reduced to the predetermined value or the like, the valve control unit 28 electrically controls the third control valve V3 to close the third control valve V3. As a result, the heating medium that flows through the second pipe 1*b* is supplied to the heater 40 and heats the heater 40.

By providing the heater bypass path 1*d* and the third control valve V3 in the heating medium circulation path 10, just as described, when overheating that the pressure or the like of the heating medium exceeds the predetermined value occurs, the control by the valve control unit 28 can cause the heating medium to flow into the heater bypass path 1*d* via the third control valve V3. That is, it is possible to reduce a supply amount of the heating medium to the heater 40. As a result, an excessive increase in the engine output due to overheating, that is, an overload on the engine unit 20 is suppressed.

By the way, when the third control valve V3 is the electromagnetic valve, control of the third control valve V3 is binary control of whether the heating medium flows/does not flow into the heater 40. When the pressure or the like of the heating medium exceeds the predetermined value, the heating medium does not flow into the heater 40. Thus, the reduced output of the engine unit 20 is concerned. From a perspective of suppressing such reduced output of the engine unit 20, the third control valve V3 is desirably a proportional electromagnetic valve. In this case, by electrically controlling the third control valve V3, the heating medium that flows through the second pipe 1*b* can partially flow into the heater bypass path 1*d* via the third control valve V3 while the rest of the heating medium is supplied to the heater 40. Thus, it is possible to suppress the reduced output of the engine unit 20, which is caused by the insufficient supply of the heating medium to the heater 40.

The third control valve V3 may be a check valve (a relief valve) instead of the electromagnetic valve or the proportional electromagnetic valve. The check valve is a valve that automatically releases a pressure in a path (a pipe) when the pressure exceeds a predetermined value. When the third control valve V3 is the check valve, electric control of the third control valve V3 by the valve control unit 28 is unnecessary.

6-4. Fourth Modified Embodiment

Figure 16:
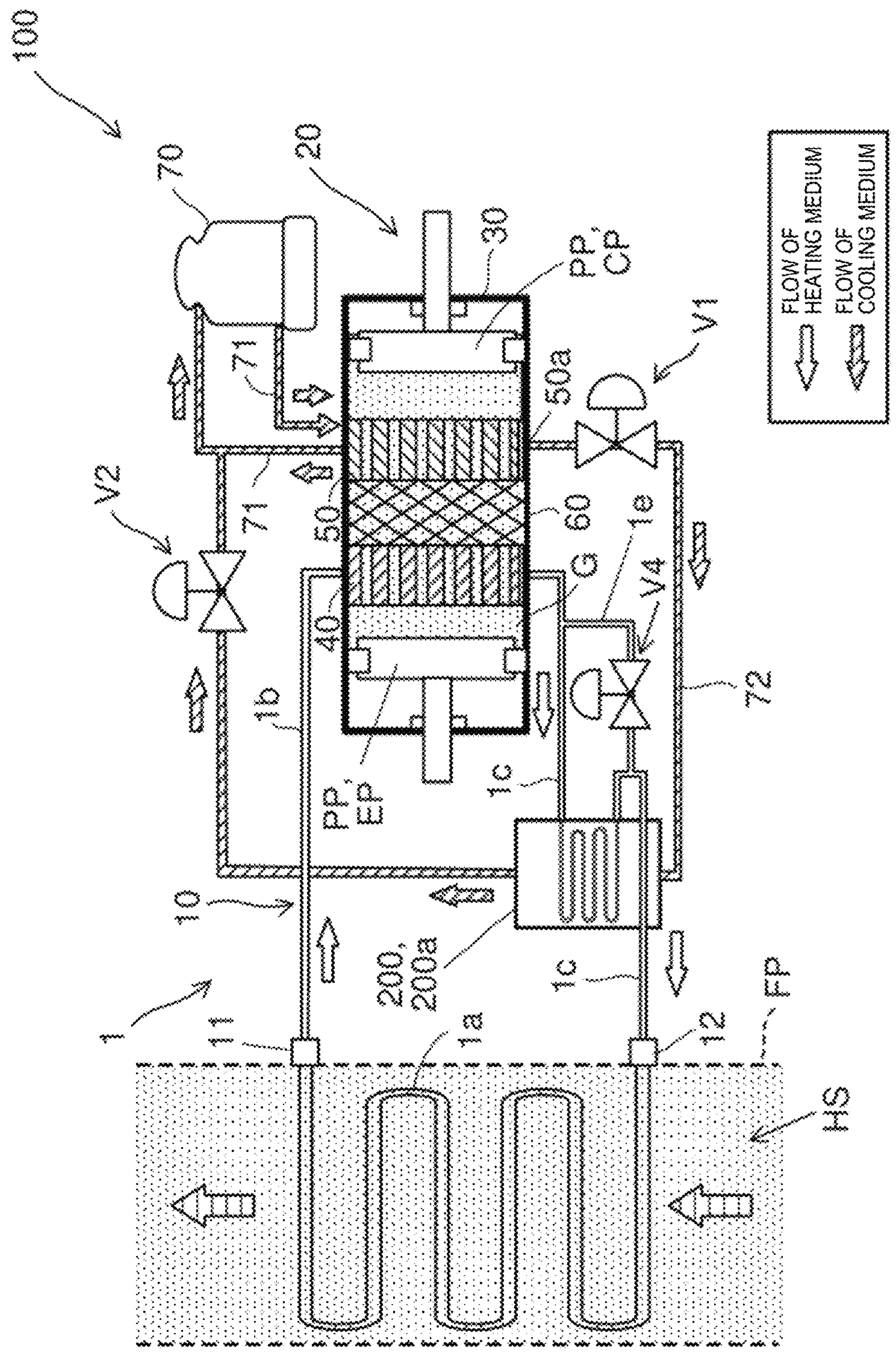
FIG. 16 is an explanatory view schematically illustrating an outline configuration of a Stirling engine according to a fourth modified embodiment.

FIG. 16 is an explanatory view schematically illustrating an outline configuration of a Stirling engine 100 according to a fourth modified embodiment. The Stirling engine 100 of the fourth modified embodiment has the same configuration as that in the second modified embodiment, except that a heat exchanger bypass path 1*e* and the fourth control valve V4 are provided in the heating medium circulation path 10.

The heat exchanger bypass path 1*e* is provided in the third pipe 1*c* in a manner to connect the upstream side and the downstream side of the heat exchanger 200. That is, the heat exchanger bypass path 1*e* is provided in the third pipe 1*c* in a manner to bypass the heat exchanger 200. The fourth control valve V4 is a heat exchanger bypass path switching valve that switches between inflow and inhibition of the inflow of the heating medium from the third pipe 1*c* to the heat exchanger bypass path 1*e*. The fourth control valve V4 is provided in the middle of the heat exchanger bypass path 1*e*. Here, it is assumed that the fourth control valve V4 is an electromagnetic valve. Just as described, the heating medium circulation path 10 includes: the heat exchanger bypass path 1*e* through which the heating medium flowing via the heater 40 bypasses the heat exchanger 200 to flow; and the fourth control valve V4 as the heat exchanger bypass path switching valve.

In the configuration of the fourth modified embodiment, when at least one of the pressure and the temperature of the heating medium exceeds the predetermined value, the valve control unit 28 of the engine controller 20*a* electrically controls the fourth control valve V4 to close the fourth control valve V4. As a result, the heating medium that is discharged from the heater 40 and flows through the third pipe 1*c* does not flow into the heat exchanger bypass path 1*e* and is supplied to the heat exchanger 200. Meanwhile, when the pressure or the like of the heating medium is reduced to the predetermined value or lower, the valve control unit 28 electrically controls the fourth control valve V4 to open the fourth control valve V4. As a result, the heating medium that is discharged from the heater 40 and flows through the third pipe 1*c* flows into the heat exchanger bypass path 1*e* and bypasses the heat exchanger 200 to flow. That is, the heating medium is not supplied to the heat exchanger 200.

As described above, in the fourth modified embodiment, the heat exchanger bypass path 1*e* and the fourth control valve V4 are provided in the heating medium circulation path 10. In this configuration, as described above, when the pressure or the like of the heating medium exceeds the predetermined value, the valve control unit 28 controls the fourth control valve V4 to inhibit the inflow of the heating medium to the heat exchanger bypass path 1*e*. In this way, the heating medium can flow into the heat exchanger 200. As a result, only when overheating that the pressure or the like of the heating medium exceeds the predetermined value occurs, the heating medium can flow into the heat exchanger 200 to absorb the thermal energy. Meanwhile, when overheating does not occur, the heating medium flows while bypassing the heat exchanger 200. Thus, the thermal energy of the heating medium is not absorbed in vain in the heat exchanger 200. As a result, it is possible to suppress the reduced output of the engine unit 20 during the normal operation by effectively using the thermal energy of the heating medium to heat the heater 40. In addition, when overheating does not occur, the heating medium flows while bypassing the heat exchanger 200. Thus, the pressure loss of the heating medium does not occur in the heat exchanger 200.

6-5. Fifth Modified Embodiment

Figure 17:
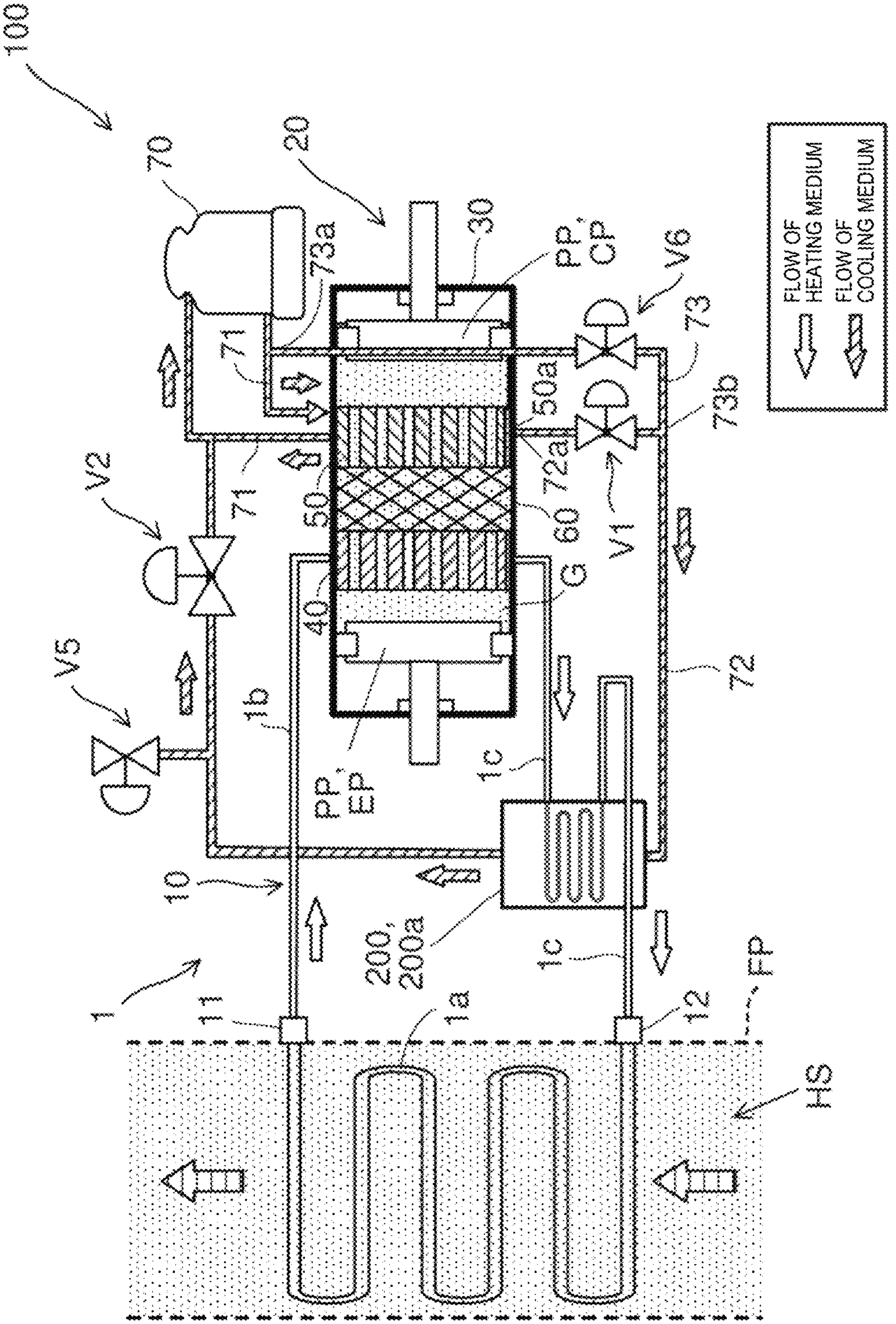
FIG. 17 is an explanatory view schematically illustrating an outline configuration of a Stirling engine according to a fifth modified embodiment.

FIG. 17 is an explanatory view schematically illustrating an outline configuration of a Stirling engine 100 according to a fifth modified embodiment. The Stirling engine 100 of the fifth modified embodiment further includes a coolant supply path 73 that merges with the coolant circulation path 72, and is provided with the fifth control valve V5 in the coolant circulation path 72 and the sixth control valve V6 in the coolant supply path 73. Otherwise, the configuration is the same as that in the second modified embodiment.

The coolant circulation path 72 has a supply port 72*a*. The supply port 72*a* is connected to the cooling medium outlet 50*a* of the cooler 50, for example. Thus, the cooling medium that is discharged from the cooling medium outlet 50*a* flows from the supply port 72*a* toward the heat exchanger 200 via the first control valve V1, and is used as the coolant for cooling the heating medium in the heat exchanger 200. That is, the supply port 72*a* constitutes a coolant supply port from which the coolant for cooling the heating medium is supplied to the heat exchanger 200. The coolant that has cooled the heating medium in the heat exchanger 200 sequentially flows through the fifth control valve V5 described below and the second control valve V2, and then returns to the cooling facility 70. Just as described, the Stirling engine 100 of the fifth modified embodiment has the coolant circulation path 72 through which the coolant flows via the heat exchanger 200.

The fifth control valve V5 is a coolant release valve that is provided on the downstream side of the heat exchanger 200 in a flow direction of the coolant in the coolant circulation path 72. More specifically, the fifth control valve V5 is provided between the heat exchanger 200 and the second control valve V2 in the coolant circulation path 72. The fifth control valve V5 may be an electromagnetic valve or a proportional electromagnetic valve, but may be a check valve similar to the third control valve V3.

The coolant supply path 73 is a pipe through which the coolant to be supplied to the heat exchanger 200 flows. The coolant supply path 73 has a first connection port 73*a* in one end portion and a second connection port 73*b* in the other end portion. The second connection port 73*b* is connected between the first control valve V1 and the heat exchanger 200 in the coolant circulation path 72. The first connection port 73*a* is connected to a cooling medium outlet of the cooling facility 70. The cooling medium (the coolant) that is discharged from the cooling facility 70 flows through the coolant supply path 73 via the first connection port 73*a* and then flows into the coolant circulation path 72 via the second connection port 73*b*. Thus, in this case, the second connection port 73*b* constitutes a coolant supply port in the coolant circulation path 72.

Here, the first connection port 73*a* may be connected to a facility that is other than the cooling facility 70 and discharges the coolant.

In the configuration of the fifth modified embodiment, when the amount of the coolant for cooling the heating medium that flows through the heat exchanger 200 is insufficient, the coolant evaporates, whereby the pressure in the coolant circulation path 72 is increased. Then, when the pressure in the coolant circulation path 72 exceeds a predetermined pressure, the fifth control valve V5 is opened to release the pressure in the coolant circulation path 72. At this time, when the fifth control valve V5 is a check valve, for example, the fifth control valve V5 is automatically opened at a point when the pressure in the coolant circulation path 72 exceeds the predetermined pressure. Meanwhile, when the fifth control valve V5 is an electromagnetic valve, for example, the pressure in the coolant circulation path 72 may be detected by a sensor (not illustrated), and the valve control unit 28 may execute control for opening the fifth control valve V5 on the basis of a detection signal from the sensor.

Just as described, by providing the fifth control valve V5 as the coolant release valve in the coolant circulation path 72, when the pressure in the coolant circulation path 72 is increased abnormally, the pressure is released by the fifth control valve V5, and the abnormal increase can thereby be suppressed.

In addition, when the coolant in the coolant circulation path 72 is sufficient, the sixth control valve V6 may remain closed. When the coolant is insufficient, the valve control unit 28 may execute control for opening the sixth control valve V6. By opening the sixth control valve V6, the coolant can be supplied (replenished) from the cooling facility 70 to the coolant circulation path 72 via the coolant supply path 73 and thereby compensate for shortage of the coolant. The coolant that is supplied to the coolant circulation path 72 through the cooler 50 absorbs the heat from the cooler 50, and thus the temperature of the coolant is increased. Meanwhile, since the coolant that is supplied from the cooling facility 70 to the coolant circulation path 72 through the coolant supply path 73 does not flow through the cooler 50, the temperature of such a coolant is lower than the coolant that is supplied to the coolant circulation path 72 through the cooler 50. Thus, it is possible to improve cooling efficiency of the heating medium by supplying the low-temperature coolant to the heat exchanger 200.

6-6. Sixth Modified Embodiment

Figure 18:
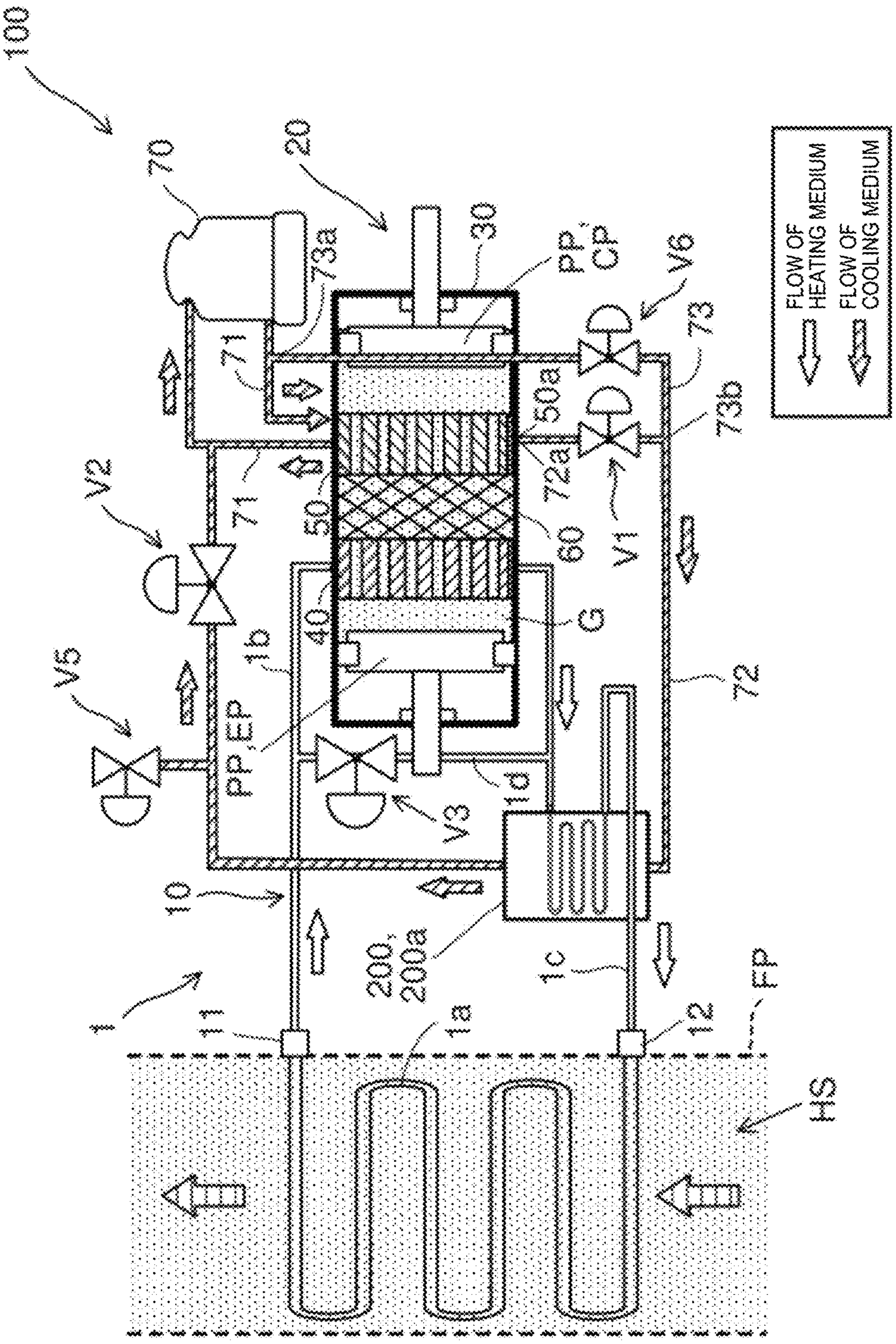
FIG. 18 is an explanatory view schematically illustrating an outline configuration of a Stirling engine according to a sixth modified embodiment.

FIG. 18 is an explanatory view schematically illustrating an outline configuration of a Stirling engine 100 according to a sixth modified embodiment. The Stirling engine 100 of the sixth modified embodiment has a configuration in which the configurations in the third and fifth modified embodiments are combined. Hereinafter, cooling control for the heating medium in this configuration will be described. Here, a description will be made on the control for cooling the heating medium on the basis of the pressure detected by the pressure detector 21 (see FIG. 11). However, the same can appliy to a case where the heating medium is cooled on the basis of the temperature detected by the heating medium temperature detector 22 (see FIG. 11). In addition, it is assumed herein that the pressure detector 21 is provided in the second pipe 1*b* (in particular, at a position near the first pipe 1*a*).

Figure 19:
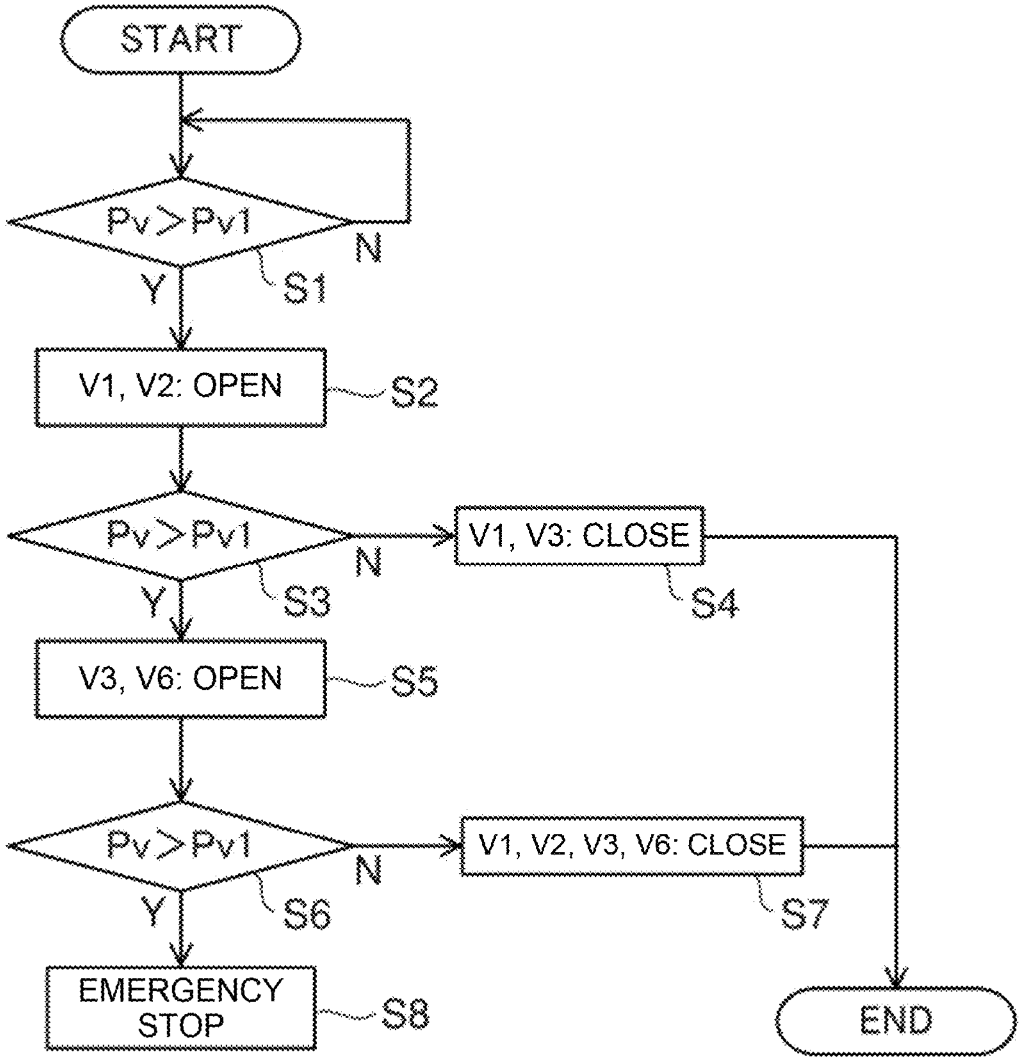
FIG. 19 is a flowchart illustrating an operation flow in the Stirling engine according to the sixth modified embodiment.

FIG. 19 is a flowchart illustrating an operation flow in the Stirling engine 100 according to the sixth modified embodiment. First, the valve control unit 28 determines whether a pressure Pv (Pa) detected by the pressure detector 21 exceeds a predetermined value Pv1 (Pa), which is set in advance (S1). If Pv>Pv1 in S1, the valve control unit 28 opens the first control valve V1 and the second control valve V2 (S2). As a result, the coolant that is discharged from the cooling medium outlet 50*a* is supplied to the heat exchanger 200 via the coolant circulation path 72, and the heating medium is thereby cooled in the heat exchanger 200.

If the pressure Pv becomes equal to or lower than the predetermined value Pv1 due to cooling of the heating medium (No in S3), the valve control unit 28 closes the first control valve V1 and the second control valve V2 (S4), and the cooling control for the heating medium is terminated.

On the other hand, if the state where the pressure Pv exceeds the predetermined value Pv1 continues (Yes in S3), the valve control unit 28 further opens the third control valve V3 and the sixth control valve V6 (S5). By opening the third control valve V3, the supply amount of the heating medium to the heater 40 is reduced, and the overload on the engine unit 20 is suppressed. In addition, by opening the sixth control valve V6, the supply amount of the coolant to the heat exchanger 200 is increased, and thus cooling of the heating medium in the heat exchanger 200 is further promoted.

Thereafter, if the pressures Pv becomes equal to or lower than the predetermined value Pv1 (No in S6), the valve control unit 28 closes all of the first control valve V1, the second control valve V2, the third control valve V3, and the sixth control valve V6 that have been opened (S7), and the cooling control for the heating medium is terminated.

On the other hand, if the state where the pressure Pv exceeds the predetermined value Pv1 continues (Yes in S6), the valve control unit 28 determines that the pressure Pv is abnormally increased, and notifies, for example, a notification unit (not illustrated) of abnormality. In this case, the Stirling engine 100 is stopped emergently (S8). For example, any of such measures that operation of a heating furnace that generates the heat source HS is stopped, that driving of the engine unit 20 (the rotation of the output shaft SH) is stopped, and that the thermosiphon 1 is pulled out from the flow path FP is taken.

In the configuration of the sixth modified embodiment, the heating medium can be cooled by preferentially controlling the first control valve V1 and the second control valve V2 and by further controlling the third control valve V3 and the sixth control valve V6 as necessary.

6-7. Seventh Modified Embodiment

Figure 20:
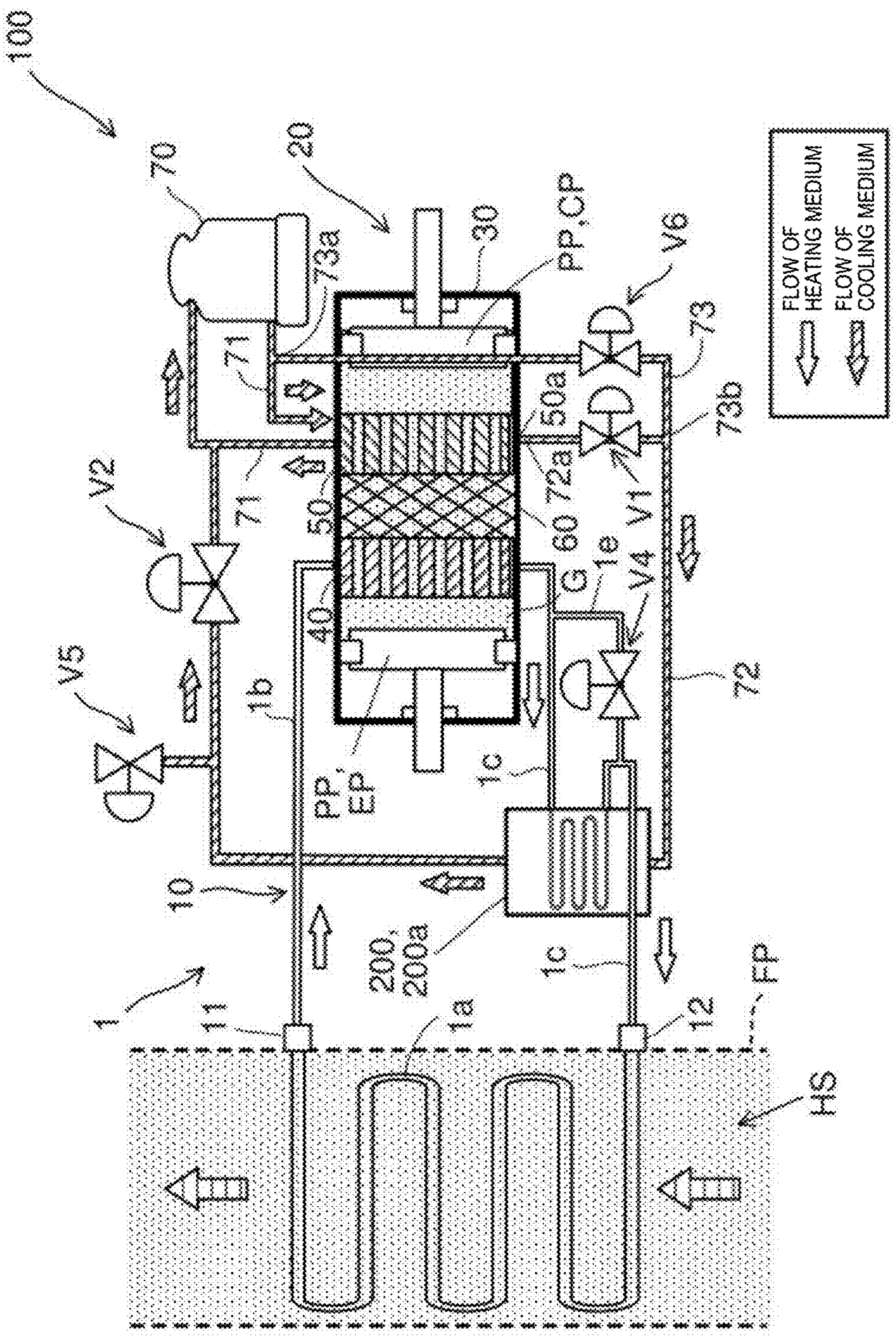
FIG. 20 is an explanatory view schematically illustrating a schematic configuration of a Stirling engine according to a seventh modified embodiment.

FIG. 20 is an explanatory view schematically illustrating an outline configuration of a Stirling engine 100 according to a seventh modified embodiment. The Stirling engine 100 of the seventh modified embodiment has a configuration in which the configurations in the fourth and fifth modified embodiments are combined. Hereinafter, the cooling control for the heating medium in this configuration will be described. Here, as in the sixth modified embodiment, a description will be made on the control for cooling the heating medium on the basis of the pressure detected by the pressure detector 21.

Figure 21:
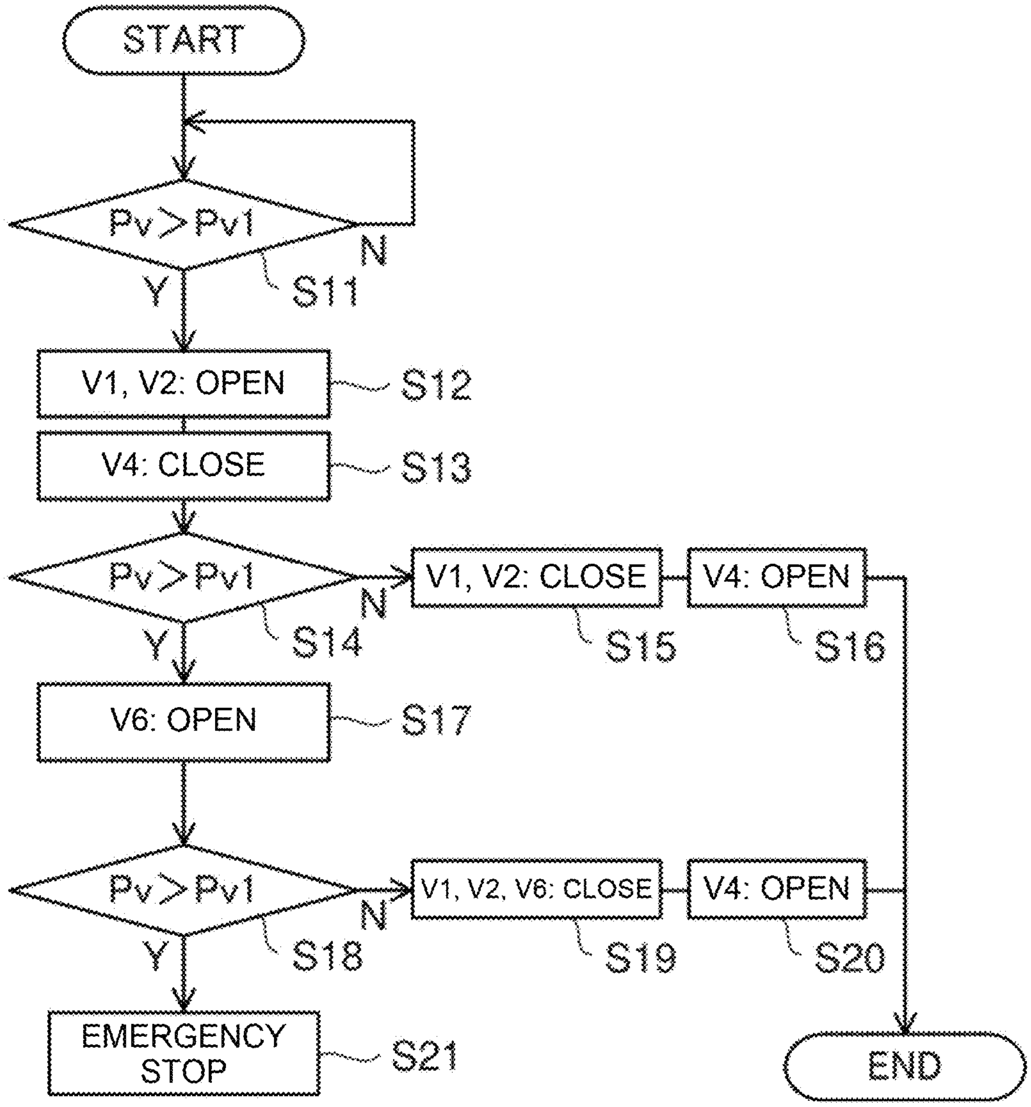
FIG. 21 is a flowchart illustrating an operation flow in the Stirling engine according to the seventh modified embodiment.

FIG. 21 is a flowchart illustrating an operation flow in the Stirling engine 100 according to the seventh modified embodiment. First, the valve control unit 28 determines whether the pressure Pv detected by the pressure detector 21 exceeds the predetermined value Pv1, which is set in advance (S11). If Pv>Pv1 in S11, the valve control unit 28 opens the first control valve V1 and the second control valve V2 (S12). As a result, the coolant that is discharged from the cooling medium outlet 50*a* is supplied to the heat exchanger 200 via the coolant circulation path 72, and the heating medium is thereby cooled in the heat exchanger 200.

It is assumed that the fourth control valve V4 is closed (S13). If the pressure Pv becomes equal to or lower than the predetermined value Pv1 due to cooling of the heating medium (No in S14), the valve control unit 28 closes the first control valve V1 and the second control valve V2 (S15) and opens the fourth control valve V4 (S16), and the cooling control for the heating medium is terminated.

On the other hand, if the state where the pressure Pv exceeds the predetermined value Pv1 continues (Yes in S14), the valve control unit 28 further opens the sixth control valve V6 (S17). As a result, the supply amount of the coolant to the heat exchanger 200 is increased, and thus cooling of the heating medium in the heat exchanger 200 is further promoted.

Thereafter, if the pressures Pv becomes equal to or lower than the predetermined value Pv1 (No in S18), the valve control unit 28 closes all of the first control valve V1, the second control valve V2, and the sixth control valve V6 that have been opened (S19), and opens the fourth control valve V4 (S20), and the cooling control for the heating medium is terminated.

On the other hand, if the state where the pressure Pv exceeds the predetermined value Pv1 continues (Yes in S18), the valve control unit 28 determines that the pressure Pv is abnormally increased, and notifies, for example, the notification unit (not illustrated) of the abnormality. In this case, as in the sixth modified embodiment, the Stirling engine 100 is stopped emergently (S21).

In the configuration of the seventh modified embodiment, the heating medium can be cooled by preferentially controlling the first control valve V1, the second control valve V2, and the fourth control valve V4 and by further controlling the sixth control valve V6 as necessary.

6-8. Eighth Modified Embodiment

Figure 22:
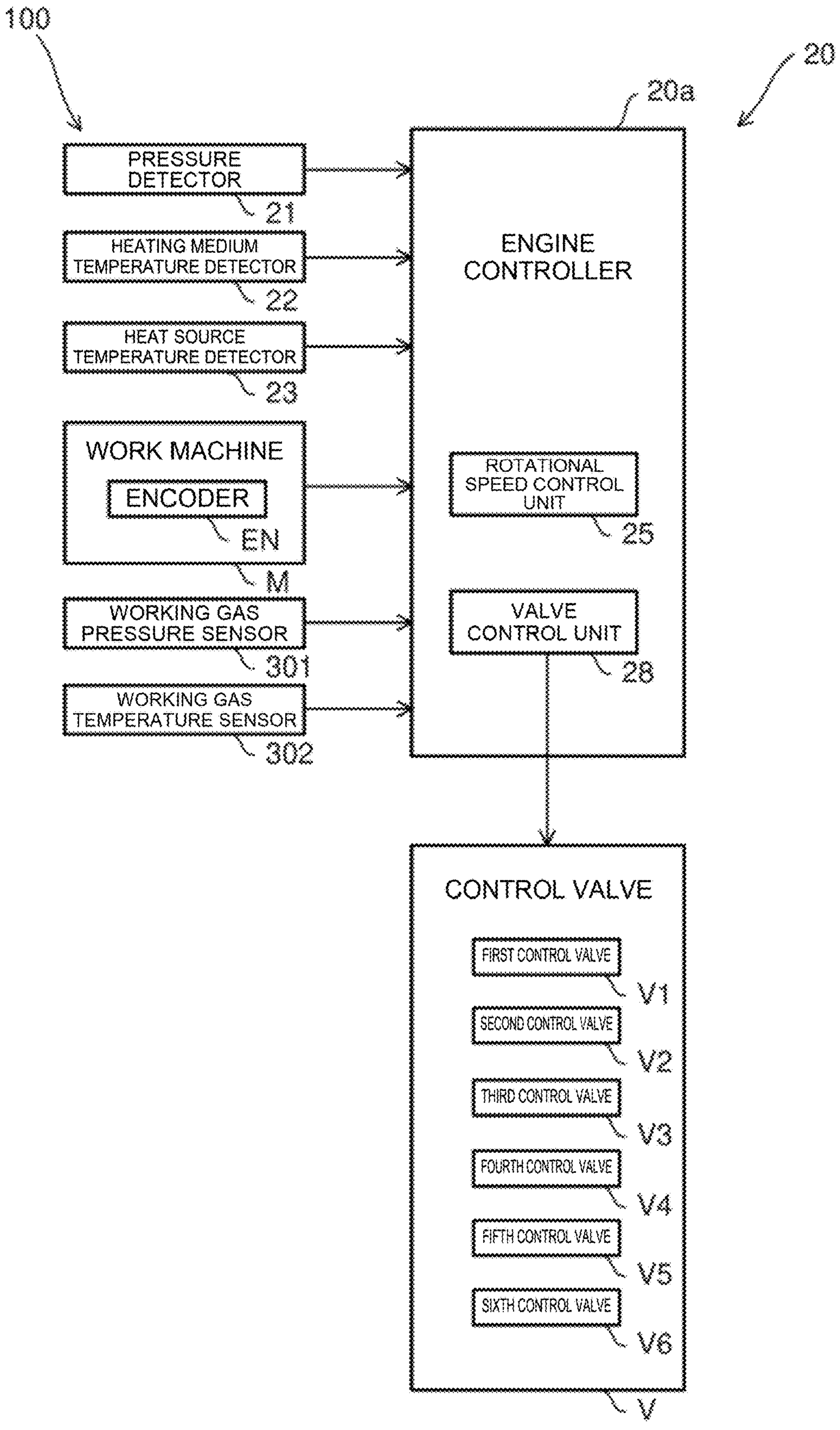
FIG. 22 is a block diagram illustrating a configuration of a main part of a Stirling engine according to an eighth modified embodiment.

FIG. 22 is a block diagram illustrating a configuration of a main part of a Stirling engine 100 according to an eighth modified embodiment. As illustrated in FIG. 22, the Stirling engine 100 of the eighth modified embodiment further includes a working gas pressure sensor 301 and a working gas temperature sensor 302 in addition to the components illustrated in FIG. 11. The working gas pressure sensor 301 is a sensor that detects a pressure of the working gas G in the body 30. The working gas temperature sensor 302 is a sensor that detects a temperature of the working gas G in the body 30. Otherwise, the configurations of the control valves V in the eighth modified embodiment are the same as those in the second modified embodiment. Thus, the Stirling engine 100 in the eighth modified embodiment has the first control valve V1 and the second control valve V2 as the control valves V. The control valves V may further include the third control valve V3 and the like.

The opening/closing control (the switching control) of the first control valve V1 and the second control valve V2 can also be used when the engine unit 20 is started in a warm state. The warm state refers to a state where, when the engine unit 20 is restarted after being started and stopped, the engine unit 20 (particularly, the inside of the body 30) is warmed by the previous start, and the pressure and the temperature of the working gas G in the body 30 are high. Hereinafter, control in the eighth modified embodiment will be described.

Figure 23:
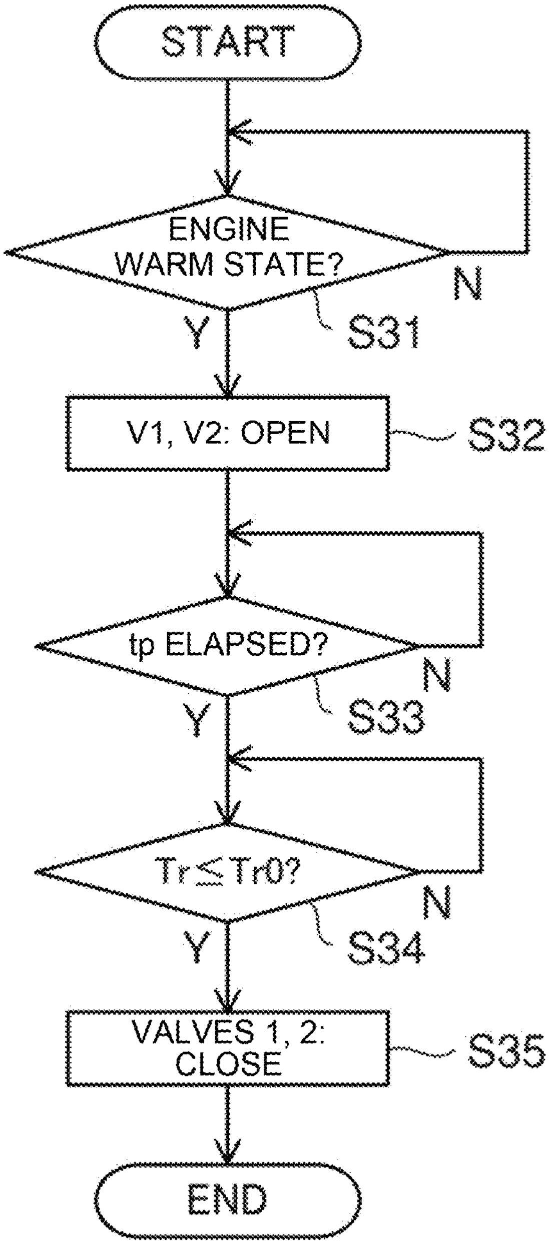
FIG. 23 is a flowchart illustrating an operation flow in the Stirling engine according to the eighth modified embodiment.

FIG. 23 is a flowchart illustrating an operation flow in the Stirling engine 100 according to the eighth modified embodiment. First, the valve control unit 28 determines whether the Stirling engine 100 (particularly, the engine unit 20) is in the warm state (S31). This determination can be made as follows, for example.

Figure 24:
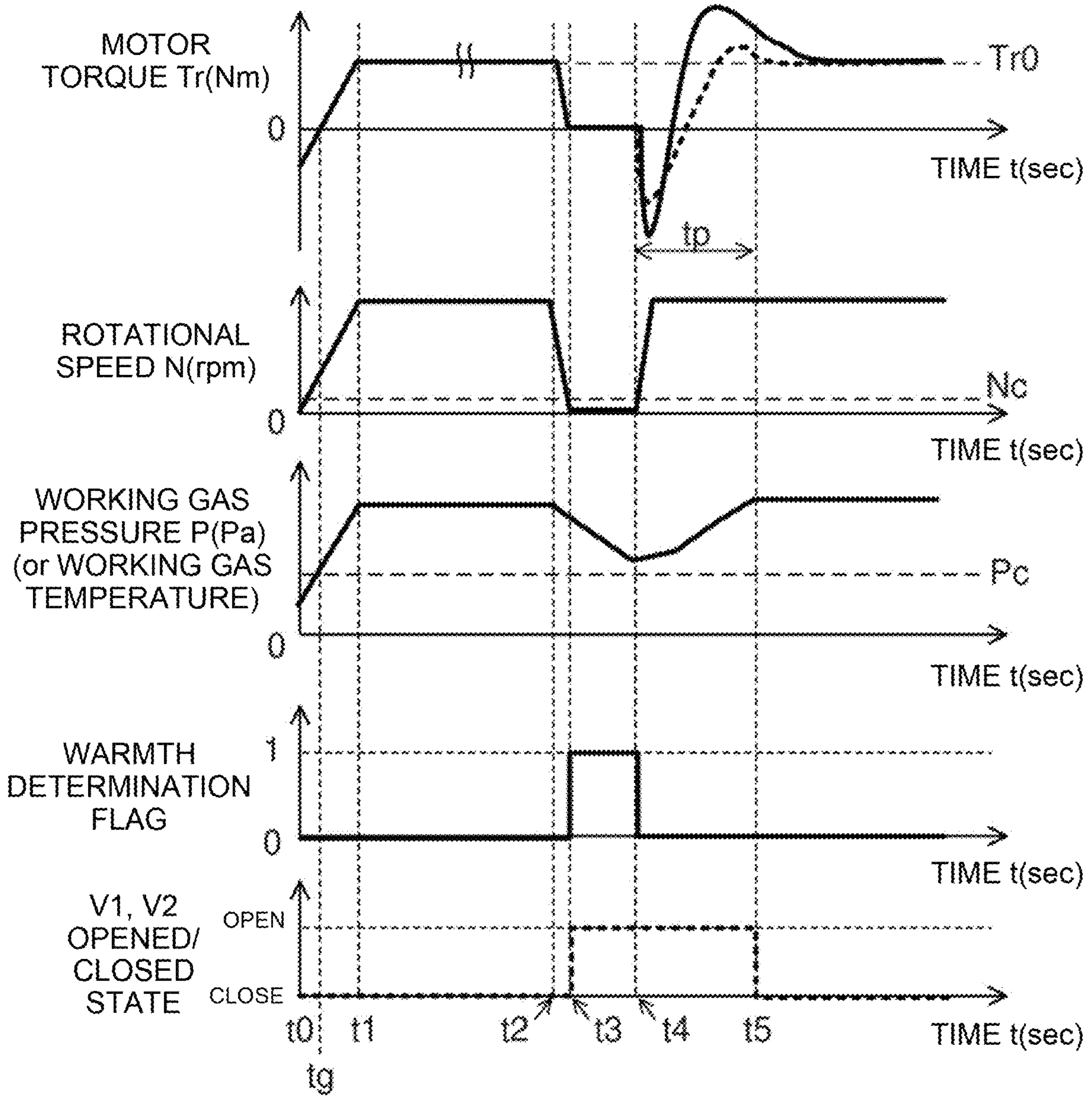
FIG. 24 includes explanatory charts, each of which schematically illustrates a change in respective parameter over time.

FIG. 24 includes explanatory charts, each of which schematically illustrates a change in respective parameter over time. Here, each of the parameters will be described. Motor torque Tr (Nm) in FIG. 24 indicates rotational torque of the output shaft SH (see FIG. 22) of the work machine M (see FIG. 1). This motor torque Tr is detected on the basis of a current that is output from the work machine M (the electric generator) A rotational speed N (rpm) indicates the rotational speed of the output shaft SH of the work machine M, and is detected on the basis of the output of the encoder EN. A working gas pressure P (Pa) indicates the pressure of the working gas G, which is detected by the working gas pressure sensor 301, in the body 30. The working gas temperature may be used instead of the working gas pressure. The working gas temperature indicates the temperature of the working gas G, which is detected by the working gas temperature sensor 302, in the body 30.

The start time of the engine unit 20 is set as time to. At the start, the work machine M is driven as the motor and causes the output shaft SH to rotate. As the rotational speed N of the output shaft SH is increased, the working gas pressure P in the body 30 is also increased, and the motor torque Tr is also increased. At time tg, the engine unit 20 is switched to autonomous operation, and the work machine M is driven as the electric generator. At time t1, when the motor torque Tr reaches a predetermined torque value Tr0 (rated torque), the rotational speed N, the working gas pressure P, and the motor torque Tr become constant.

At time t2, when some stop factor (for example, electricity failure, sensor abnormality, or the like) occurs at time t2, the rotational speed N, the working gas pressure P, and the motor torque Tr start being reduced, and driving of the engine unit 20 and the work machine M is stopped at time t3. When the work machine M is stopped, the rotational speed N and the motor torque Tr each become zero. Meanwhile, the working gas pressure P is not reduced to an initial value (for example, the pressure at the time to) at the time t3, and is higher than the predetermined pressure Pc (the warm state).

In this state, for example, at time t4, when the engine unit 20 and the work machine M are restarted, the required torque to start the work machine M is increased due to the high internal pressure (the working gas pressure P) in the body 30. In addition, due to the high internal pressure of the body 30, the output of the engine unit 20 (the rotational speed N of the work machine M) becomes excessive immediately after the start. That is, as illustrated in FIG. 24, the motor torque Tr is significantly reduced to a negative side until the autonomous operation, and is significantly increased to a positive side after the autonomous operation (see a solid line of the motor torque Tr in the chart).

Thus, at the time t3 prior to the time t4, the valve control unit 28 determines whether the rotational speed N of the output shaft SH is equal to or lower than the predetermined rotational speed Nc and the working gas pressure P is equal to or higher than the predetermined pressure Pc. If N≤Nc and P≥Pc, the valve control unit 28 determines that the engine unit 20 is in the warm state (a warmth determination flag is turned to "1" indicating the warm state), and opens the first control valve V1 and the second control valve V2 (S32). As a result, the absorbed amount of the thermal energy from the heating medium by the heat exchanger 200 is increased, and the heat input to the engine unit 20 (particularly, the heater 40) by the heating medium is reduced.

As a result, the working gas pressure P in the body 30 is reduced, and the temperature of the working gas G is reduced.

In this state, when the engine unit 20 and the work machine M are restarted (the warmth determination flag is turned to "O" by the restart) at the time t4, the rotational speed N of the output shaft SH is increased, and the working gas pressure P and the motor torque Tr are increased. From the time t3 to the time t4, the pressure and the temperature of the working gas G are reduced in the body 30. Thus, even when the work machine M are restarted at the time t4, the increase in the required torque to start the work machine M is suppressed. In addition, the excessive increase in the output of the engine unit 20 (the rotational speed N of the work machine M) immediately after the start is also suppressed (see a broken line of the motor torque Tr in the chart of FIG. 24).

When a predetermined time tp (sec) elapses from the time t4 (S33), and the motor torque Tr becomes equal to or lower than the predetermined value Tr0 (Nm) (S34), the valve control unit 28 closes the first control valve V1 and the second control valve V2 (S35), and the series of the control is terminated. In FIG. 24, the first control valve V1 and the second control valve V2 are closed at time t5.

As it has been described so far, the control valves V (the first control valve V1 and the second control valve V2) are provided in the coolant circulation path 72, and if the engine unit 20 is in the warm state (N≤Nc and P≥Pc are satisfied), the valve control unit 28 opens the control valves V (S31, S32). As a result, by reducing the input heat to the engine unit 20 by the heating medium, it is possible to suppress the increase in the start torque at the restart of the engine unit 20 in the warm state and to suppress the excessive engine output immediately after the start.

Of course, it is also possible to control opening/closing of each of the control valves V by further combining the configurations in the first to eighth modified embodiments described so far.

7. SUPPLEMENTARY NOTES

The Stirling engine that has been described in the present embodiment can also be expressed as follows.

A Stirling engine of Supplementary Note (1) includes:

a thermosiphon that accommodates a heating medium receiving heat from a heat source; and an engine unit that has a body accommodating working gas, a heater that gives the heat to the working gas by the heating medium being arranged in the body, and further includes:

an engine controller that executes control for increasing an absorbed amount of thermal energy from the heating medium when at least one of a pressure and a temperature of the heating medium exceeds a predetermined value.

In a Sitrling engine of Supplementary Note (2), in the Stirling engine of Supplementary Note (1), the control for increasing the absorbed amount is control for increasing output of the engine unit (to be greater than the output at a point of exceeding the predetermined value).

In a Stirling engine of Supplementary Note (3), in the Stirling engine of Supplementary Note (2), the engine controller includes a rotational speed control unit that controls a rotational speed of a work machine driven by the engine unit, and the rotational speed control unit increases the rotational speed of the work machine (to be higher than the rotational speed at the point of exceeding the predetermined value) when at least one of the pressure and the temperature of the heating medium exceeds the predetermined value.

A Stirling engine of Supplementary Note (4), in the Stirling engine of Supplementary Note (3), further includes:

a pressure detector that detects the pressure of the heating medium, in which the rotational speed control unit increases the rotational speed of the work machine when the pressure of the heating medium exceeds a first predetermined value as the predetermined value.

A Stirling engine of Supplementary Note (5), in the Stirling engine of Supplementary Note (3) or (4), further includes:

a heating medium temperature detector that detects the temperature of the heating medium, in which the rotational speed control unit increases the rotational speed of the work machine when the temperature of the heating medium exceeds a second predetermined value as the predetermined value.

A Stirling engine of Supplementary Note (6), in the Stirling engine of any one of Supplementary Notes (3) to (5), further includes:

a heat source temperature detector that detects a temperature of the heat source, in which the rotational speed control unit increases the rotational speed of the work machine when the temperature of the heat source exceeds a third predetermined value that corresponds to the predetermined value.

A Stirling engine of Supplementary Note (7), in the Stirling engine of Supplementary Note (6), further includes:

a plurality of the heat source temperature detectors, in which the rotational speed control unit determines the temperature of the heat source on the basis of detected temperatures by the plurality of the heat source temperature detectors.

In a Stirling engine of Supplementary Note (8), in the Stirling engine of Supplementary Note (6) or (7), the thermosiphon is partially arranged in a flow path through which the heat source moves, and the heat source temperature detector is arranged on an upstream side of the thermosiphon (in the path).

In a Stirling engine of Supplementary Note (9), in the Stirling engine of any one of Supplementary Notes (3) to (8), a cooler that cools the working gas by a cooling medium is further arranged in the body, and the rotational speed control unit increases the rotational speed of the work machine by controlling at least one of a water amount and a temperature of the cooling medium when at least one of the pressure and the temperature of the heating medium exceeds the predetermined value.

A Stirling engine of Supplementary Note (10), in the Stirling engine of Supplementary Note (9), further includes:

a cooling medium adjustment unit that adjusts at least one of the water amount and the temperature of the cooling medium, in which the rotational speed control unit increases the rotational speed of the work machine by controlling the cooling medium adjustment unit.

In a Stirling engine of Supplementary Note (11), in the Stirling engine of any one of Supplementary Notes (3) to (10), the work machine includes a rotational speed detector that detects the rotational speed, and the rotational speed control unit recognizes a rotational speed at a point of exceeding the predetermined value by detection by the rotational speed detector and controls the rotational speed of the work machine.

In a Stirling engine of Supplementary Note (12), in the Stirling engine of Supplementary Note (1), the control for increasing the absorbed amount is cooling control for the heating medium by a heat exchanger that is provided in the middle of a heating medium circulation path, through which the heating medium flows via the heater.

In a Stirling engine of Supplementary Note (13), in the Stirling engine of Supplementary Note (12), the heat exchanger is a condenser that cools the heating medium through cooling, a cooler that cools the working gas by a cooling medium is provided in the body, and a coolant that cools the heating medium in the condenser is the cooling medium that is supplied from a cooling medium outlet of the cooler.

In a Stirling engine of Supplementary Note (14), in the Stirling engine of Supplementary Note (12) or (13), the heat exchanger is provided on a downstream side of the heater in a flow direction of the heating medium that flows through the heating medium circulation path.

In a Stirling engine of Supplementary Note (15), in the Stirling engine of any one of Supplementary Notes (12) to (14), the heating medium circulation path includes:

a heater bypass path that bypasses the heater; and a heater bypass path switching valve that switches between inflow and inhibition of the inflow of the heating medium to the heater bypass path.

In a Stirling engine of Supplementary Note (16), in the Stirling engine of Supplementary Note (15), the engine controller includes a valve control unit that controls the heater bypass path switching valve, and the valve control unit causes the heating medium to flow into the heater bypass path via the heater bypass path switching valve when at least one of the pressure and the temperature of the heating medium exceeds the predetermined value.

In a Stirling engine of Supplementary Note (17), in the Stirling engine of any one of Supplementary Notes (12) to (16), the heating medium circulation path includes:

a heat exchanger bypass path through which the heating medium, which flows via the heater, flows while bypassing the heat exchanger; and a heat exchanger bypass path switching valve that switches between inflow and inhibition of the inflow of the heating medium to the heat exchanger bypass path.

In a Stirling engine of Supplementary Note (18), in the Stirling engine of Supplementary Note (17), the engine controller includes a valve control unit that controls a heat exchanger bypass path switching valve, and when at least one of the pressure and the temperature of the heating medium exceeds the predetermined value, the valve control unit controls the heat exchanger bypass path switching valve to inhibit the inflow of the heating medium to the heat exchanger bypass path, and thereby causes the heating medium to flow into the heat exchanger.

A Stirling engine of Supplementary Note (19), in the Stirling engine of any one of Supplementary Notes (12) to (18), further includes:

a coolant circulation path that has a supply port of a coolant for cooling the heating medium and through which the coolant flows via the heat exchanger; and a coolant release valve provided on a downstream side of the heat exchanger in a flow direction of the coolant.

Although the embodiments of the present invention have been described so far, the scope of the present invention is not limited thereto, and can be expanded or modified without departing from the gist of the invention.

INDUSTRIAL APPLICABILITY

The present invention can be used for the Stirling engine that uses the heat of the heat source, such as the exhaust heat, to drive the engine unit through heat exchange.

REFERENCE SIGNS LIST

1 thermosiphon
1*d* heater bypass path
1*e* heat exchanger bypass path
10 heating medium circulation path
20 engine unit
20*a* engine controller
21 pressure detector
22 heating medium temperature detector
23 heat source temperature detector
24 cooling medium adjustment unit
25 rotational speed control unit (engine controller)
28 valve control unit (engine controller)
30 body
40 heater
50 cooler

50*a* cooling medium outlet
72 coolant circulation path
72*a* supply port
73*b* second connection port (supply port)
100 Stirling engine
200 heat exchanger
200*a* condenser
EN encoder (rotational speed detector)
FP flow path
G working gas
HS heat source
M work machine
V3 third control valve (heater bypass path switching valve)
V4 fourth control valve (heat exchanger bypass path switching valve)
V5 fifth control valve (coolant release valve)

The invention claimed is:

1. A Stirling engine comprising:
a thermosiphon that accommodates a heating medium receiving heat from a heat source;
an engine unit that has a body accommodating working gas;
a heater being arranged in the body, which gives the heat to the working gas by the heating medium; and
an engine controller configured to control an increase in an absorbed amount of thermal energy from the heating medium when at least one of a pressure and a temperature of the heating medium exceeds a predetermined value,
wherein controlling the increase in the absorbed amount controls an increase in output of the engine unit,
the engine controller includes a rotational speed control unit that controls a rotational speed of a work machine driven by the engine unit, and
the rotational speed control unit increases the rotational speed of the work machine when at least one of the pressure and the temperature of the heating medium exceeds the predetermined value.

2. The Stirling engine according to claim 1, further comprising:
a pressure detector that detects the pressure of the heating medium, wherein
the rotational speed control unit increases the rotational speed of the work machine when the pressure of the heating medium exceeds a first predetermined value as the predetermined value.

3. The Stirling engine according to claim 1, further comprising:
a heating medium temperature detector that detects the temperature of the heating medium, wherein
the rotational speed control unit increases the rotational speed of the work machine when the temperature of the heating medium exceeds a second predetermined value as the predetermined value.

4. The Stirling engine according to claim 1, further comprising:
a heat source temperature detector that detects a temperature of the heat source, wherein
the rotational speed control unit increases the rotational speed of the work machine when the temperature of the heat source exceeds a third predetermined value that corresponds to the predetermined value.

5. The Stirling engine according to claim 4, further comprising:
a plurality of the heat source temperature detectors, wherein
the rotational speed control unit determines the temperature of the heat source on the basis of detected temperatures by the plurality of the heat source temperature detectors.

6. The Stirling engine according to claim 4, wherein
the thermosiphon is partially arranged in a flow path through which the heat source moves, and
the heat source temperature detector is arranged on an upstream side of the thermosiphon.

7. The Stirling engine according to claim 3, wherein
a cooler that cools the working gas by a cooling medium is further arranged in the body, and
the rotational speed control unit increases the rotational speed of the work machine by controlling at least one of a water amount and a temperature of the cooling medium when at least one of the pressure and the temperature of the heating medium exceeds the predetermined value.

8. The Stirling engine according to claim 7, further comprising:
a cooling medium adjustment unit that adjusts at least one of the water amount and the temperature of the cooling medium, wherein
the rotational speed control unit increases the rotational speed of the work machine by controlling the cooling medium adjustment unit.

9. The Stirling engine according to claim 1, wherein
the work machine includes a rotational speed detector that detects the rotational speed, and
the rotational speed control unit recognizes a rotational speed at a point of exceeding the predetermined value by detection by the rotational speed detector and controls the rotational speed of the work machine.

10. The Stirling engine according to claim 1, wherein
controlling the increase in the absorbed amount controls cooling for the heating medium by a heat exchanger that is provided in the middle of a heating medium circulation path, through which the heating medium flows via the heater.

11. The Stirling engine according to claim 10, wherein
the heat exchanger is a condenser that cools the heating medium through cooling,
a cooler that cools the working gas by a cooling medium is provided in the body, and
a coolant that cools the heating medium in the condenser is the cooling medium that is supplied from a cooling medium outlet of the cooler.

12. The Stirling engine according to claim 10, wherein
the heat exchanger is provided on a downstream side of the heater in a flow direction of the heating medium that flows through the heating medium circulation path.

13. The Stirling engine according to claim 10, wherein
the heating medium circulation path includes:
a heater bypass path that bypasses the heater; and
a heater bypass path switching valve that switches between inflow and inhibition of the inflow of the heating medium to the heater bypass path.

14. The Stirling engine according to claim 13, wherein
the engine controller includes a valve control unit that controls the heater bypass path switching valve, and
the valve control unit causes the heating medium to flow into the heater bypass path via the heater bypass path switching valve when at least one of the pressure and the temperature of the heating medium exceeds the predetermined value.

15. The Stirling engine according to claim 10, wherein
the heating medium circulation path includes:

a heat exchanger bypass path through which the heating medium, which flows via the heater, flows while bypassing the heat exchanger; and a heat exchanger bypass path switching valve that switches between inflow and inhibition of the inflow of the heating medium to the heat exchanger bypass path.

16. The Stirling engine according to claim 15, wherein the engine controller includes a valve control unit that controls the heat exchanger bypass path switching valve, and when at least one of the pressure and the temperature of the heating medium exceeds the predetermined value, the valve control unit controls the heat exchanger bypass path switching valve to inhibit the inflow of the heating medium to the heat exchanger bypass path, and thereby causes the heating medium to flow into the heat exchanger.

17. The Stirling engine according to claim 10, further comprising:

a coolant circulation path that has a supply port of a coolant for cooling the heating medium and through which the coolant flows via the heat exchanger; and a coolant release valve provided on a downstream side of the heat exchanger in a flow direction of the coolant.

18. A Stirling engine comprising:

a thermosiphon that accommodates a heating medium receiving heat from a heat source;

an engine unit that has a body accommodating working gas;

a heater being arranged in the body, which gives the heat to the working gas by the heating medium; and an engine controller configured to control an increase in an absorbed amount of thermal energy from the heating medium when at least one of a pressure and a temperature of the heating medium exceeds a predetermined value, wherein controlling the increase in the absorbed amount controls cooling for the heating medium by a heat exchanger that is provided in the middle of a heating medium circulation path, through which the heating medium flows via the heater.

* * * * *